US010897383B2

(12) United States Patent
Huang et al.

(10) Patent No.: US 10,897,383 B2
(45) Date of Patent: Jan. 19, 2021

(54) REFERENCE SIGNAL SEQUENCE IDENTIFICATION IN WIRELESS COMMUNICATIONS

(71) Applicant: QUALCOMM Incorporated, San Diego, CA (US)

(72) Inventors: Yi Huang, San Diego, CA (US); Xiao Feng Wang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/862,960

(22) Filed: Apr. 30, 2020

(65) Prior Publication Data
US 2020/0259689 A1 Aug. 13, 2020

Related U.S. Application Data

(63) Continuation of application No. 16/456,340, filed on Jun. 28, 2019.
(Continued)

(51) Int. Cl.
*H04W 8/24* (2009.01)
*H04L 27/144* (2006.01)
(Continued)

(52) U.S. Cl.
CPC ........ *H04L 27/144* (2013.01); *H04J 13/0062* (2013.01); *H04L 5/0051* (2013.01);
(Continued)

(58) Field of Classification Search
CPC ...... H04W 76/27; H04W 8/24; H04L 27/144; H04L 27/2614; H04L 5/0051
See application file for complete search history.

(56) References Cited

U.S. PATENT DOCUMENTS 9,226,290 B2 12/2015 Gaal et al.
10,616,017 B2 * 4/2020 Liu .................... H04L 27/2602
(Continued)

OTHER PUBLICATIONS

Huawei et al., "Design of UL DMRS Sequence for Data Transmission", 3GPP Draft, R1-1720635, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369254, 11 Pages, Retrieved from the Internet: URL:http://www.3gpp.org/ftp/tsg%5Fran/WG1%5FRL1/TSGR1%5F91/Docs/ [retrieved on Nov. 17, 2017], Section 3.
(Continued)

*Primary Examiner* — Wei Zhao
(74) *Attorney, Agent, or Firm* — Holland & Hart LLP/Qualcomm Incorporated

(57) ABSTRACT

Methods, systems, and devices for wireless communications are described in which a base station may provide an indication of a reference signal to be used in demodulation of a π/2 BPSK modulation scheme for communications between a UE and the base station. The base station may indicate whether a first type of reference signal or a second type of reference signal is to be transmitted. The second type of reference signal may be a π/2 BPSK DMRS that has a reference signal sequence that has a lower PAPR. The second type of reference signal sequence may be a power deboosted version of the first reference signal sequence. The indication from the base station of the type of reference signal may be provided via RRC signaling, such as a cell-specific RRC transmission or a UE-specific RRC transmission.

30 Claims, 17 Drawing Sheets

Related U.S. Application Data

(60) Provisional application No. 62/693,860, filed on Jul. 3, 2018.

(51) Int. Cl.
  *H04W 76/27* (2018.01)
  *H04J 13/00* (2011.01)
  *H04L 5/00* (2006.01)
  *H04L 27/26* (2006.01)
  *H04W 48/08* (2009.01)

(52) U.S. Cl.
  CPC .......... *H04L 27/2614* (2013.01); *H04W 8/24* (2013.01); *H04W 48/08* (2013.01); *H04W 76/27* (2018.02)

(56) References Cited

U.S. PATENT DOCUMENTS

| | | |
|---|---|---|
| 2012/0113866 A1 | 5/2012 | Tenny et al. |
| 2019/0229967 A1* | 7/2019 | Frank .................. H04L 27/2605 |
| 2020/0014569 A1 | 1/2020 | Huang et al. |
| 2020/0059335 A1* | 2/2020 | Hu ........................ H04L 5/0094 |

OTHER PUBLICATIONS

Interdigital et al: "Remaining Issues on DMRS," 3GPP Draft;R1-1720633, DMRS, 3rd Generation Partnership Project (3GPP), Mobilecompetence Centre; 650, Route Des Lucioles; F-06921 Sophia-Antipolis Cedex;France, vol. RAN WG1, No. Reno, USA; Nov. 27, 2017-Dec. 1, 2017, Nov. 18, 2017,XP051370098, 14 pages, Retrieved from the Internet: URL: http://www.3gpp.org/ftp/tsg%5Fran/WG1%5FRL1/TSGR1%5F91/Docs/ [retrieved onNov. 18, 2017] section 2.

Internationalsearch Report and Written Opinion—PCT/US2019/040087—ISA/EPO—dated Oct. 22, 2019.

QUALCOMM Incorporated: "Remaining Issues on DMRS Design", 3GPP Draft, R1-1721432, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Dec. 5, 2017 (Dec. 5, 2017), XP051370808, pp. 1-29, Retrieved from the Internet: URL:http://www.3gpp.org/ftp/tsg%Fran/WG1%5FRL1/TSGR1%5F91/Docs/ [retrieved on Dec. 5, 2017], Section 7.3.

\* cited by examiner

1st Reference Signal (UE1) 315

2nd Reference Signal (UE2) 325

Data Transmission 320

REFERENCE SIGNAL SEQUENCE IDENTIFICATION IN WIRELESS COMMUNICATIONS

CROSS REFERENCE

The present application for patent is a Continuation of U.S. patent application Ser. No. 16/456,340 by HUANG, et al., entitled "REFERENCE SIGNAL SEQUENCE IDENTIFICATION IN WIRELESS COMMUNICATIONS," filed Jun. 28, 2019, which claims the benefit of U.S. Provisional Patent Application No. 62/693,860 by HUANG et al., entitled "REFERENCE SIGNAL SEQUENCE IDENTIFICATION IN WIRELESS COMMUNICATIONS," filed Jul. 3, 2018, each of which is assigned to the assignee hereof and expressly incorporated by reference herein.

BACKGROUND

The following relates generally to wireless communications, and to reference signal sequence identification in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support reference signal sequence identification in wireless communications. Various described techniques provide for indicating a reference signal to be used in demodulation of a π/2 binary phase shift keying (BPSK) modulation scheme for communications between a user equipment (UE) and a base station. In some cases, the base station may indicate a first type of reference signal or a second type of reference signal that is to be transmitted. The indication from the base station of the type of reference signal may be provided via radio resource control (RRC) signaling, such as a cell-specific RRC transmission that indicates the type of reference signal sequence to be used by each UE in a cell served by the base station (e.g., a system information block (SIB) transmission, an other system information (OSI) transmission, or a remaining minimum system information (RMSI) transmission), or a UE-specific RRC transmission provided to each UE.

The first type of reference signal may be based on a Zadoff-Chu (ZC) sequence, in some examples, that is usable by all UEs served by the base station, and the second type of reference signal may be usable by fewer than all UEs served by the base station (e.g., UEs that are capable of operating according to a newer release of a wireless communications standard). In some cases, the second type of reference signal has a reference signal sequence that has a lower peak to average power ratio (PAPR) than the first type of reference signal. In other cases, the second type of reference signal sequence may be a power deboosted version of the first reference signal sequence (e.g., a power deboosted ZC sequence).

A method of wireless communication at a UE is described. The method may include establishing a connection with a base station that uses a π/2 BPSK modulation scheme for at least a portion of wireless communications with the base station, receiving, from the base station, an indication of a type of reference signal sequence to be included within transmissions that use the π/2 BPSK modulation scheme, generating a reference signal based on the indication of the type of reference signal sequence, and transmitting the reference signal within communications that use the π/2 BPSK modulation scheme.

An apparatus for wireless communication at a UE is described. The apparatus may include a processor, memory in electronic communication with the processor, and instructions stored in the memory. The instructions may be executable by the processor to cause the apparatus to establish a connection with a base station that uses a π/2 BPSK modulation scheme for at least a portion of wireless communications with the base station, receive, from the base station, an indication of a type of reference signal sequence to be included within transmissions that use the π/2 BPSK modulation scheme, generate a reference signal based on the indication of the type of reference signal sequence, and transmit the reference signal within communications that use the π/2 BPSK modulation scheme.

Another apparatus for wireless communication at a UE is described. The apparatus may include means for establishing a connection with a base station that uses a π/2 BPSK modulation scheme for at least a portion of wireless communications with the base station, receiving, from the base station, an indication of a type of reference signal sequence to be included within transmissions that use the π/2 BPSK modulation scheme, generating a reference signal based on the indication of the type of reference signal sequence, and transmitting the reference signal within communications that use the π/2 BPSK modulation scheme.

A non-transitory computer-readable medium storing code for wireless communication at a UE is described. The code may include instructions executable by a processor to establish a connection with a base station that uses a π/2 BPSK modulation scheme for at least a portion of wireless communications with the base station, receive, from the base station, an indication of a type of reference signal sequence to be included within transmissions that use the π/2 BPSK modulation scheme, generate a reference signal based on the indication of the type of reference signal sequence, and transmit the reference signal within communications that use the π/2 BPSK modulation scheme.

In some examples of the method, apparatuses, and non-transitory computer-readable medium described herein, the indication of the type of reference signal sequence indicates a first type of reference signal sequence or a second type of reference signal sequence. In some examples of the method, apparatuses, and non-transitory computer-readable medium described herein, the second type of reference signal sequence may have a lower PAPR than the first type of reference signal. In some examples of the method, apparatuses, and non-transitory computer-readable medium described herein, the second type of reference signal sequence may be a power deboosted version of the first sequence. In some examples of the method, apparatuses, and non-transitory computer-readable medium described herein, the first type of reference signal sequence may be a ZC sequence and the second type of reference signal sequence may be a power deboosted ZC sequence or a π/2 BPSK demodulation reference signal (DMRS) sequence. In some examples of the method, apparatuses, and non-transitory computer-readable medium described herein, the indication of the type of reference signal sequence indicates the power deboosted ZC sequence and an amount of power deboosting to apply relative to data transmissions that use the π/2 BPSK modulation scheme.

In some examples of the method, apparatuses, and non-transitory computer-readable medium described herein, the indication from the base station may be received via RRC signaling. In some examples of the method, apparatuses, and non-transitory computer-readable medium described herein, the RRC signaling may be a cell-specific RRC transmission that indicates the type of reference signal sequence to be used by each UE in a cell served by the base station. In some examples of the method, apparatuses, and non-transitory computer-readable medium described herein, the cell-specific RRC transmission includes a SIB transmission, an OSI transmission, or an RMSI transmission from the base station. In some examples of the method, apparatuses, and non-transitory computer-readable medium described herein, the RRC signaling may be a UE-specific RRC transmission that indicates the type of reference signal sequence to be used by the UE.

Some examples of the method, apparatuses, and non-transitory computer-readable medium described herein may further include operations, features, means, or instructions for transmitting a capability indication to the base station that indicates supported types of reference signals at the UE, and where the indication of the type of reference signal may be received responsive to the capability indication. In some examples of the method, apparatuses, and non-transitory computer-readable medium described herein, the indication of the type of reference signal sequence provides an initial type of reference signal sequence, and where the UE may further may perform or include features, means, or instructions for transmitting a capability indication to the base station that indicates supported types of reference signals at the UE, receiving, responsive to the capability indication, a second indication of the type of reference signal sequence to be included within transmissions that use the π/2 BPSK modulation scheme, and generating a reference signal based on the second indication of the type of reference signal sequence.

In some examples of the method, apparatuses, and non-transitory computer-readable medium described herein, the generating the reference signal may include operations, features, means, or instructions for identifying a set of allocated resource blocks and a number of the allocated resource blocks for at least a first transmission using the π/2 BPSK modulation scheme, determining a bit sequence length for the reference signal corresponding to the number of allocated resource blocks, and generating the reference signal based on a bit sequence having the bit sequence length.

A method of wireless communication at a base station is described. The method may include establishing a connection with at least a first UE that uses a π/2 BPSK modulation scheme for at least a portion of wireless communications with the first UE, transmitting an indication of a type of reference signal sequence to be included within transmissions of at least the first UE that use the π/2 BPSK modulation scheme, receiving a transmission from at least the first UE that uses the π/2 BPSK modulation scheme and that includes a reference signal based on the indication of the type of reference signal sequence, and demodulating the transmission based on the reference signal.

An apparatus for wireless communication at a base station is described. The apparatus may include a processor, memory in electronic communication with the processor, and instructions stored in the memory. The instructions may be executable by the processor to cause the apparatus to establish a connection with at least a first UE that uses a π/2 BPSK modulation scheme for at least a portion of wireless communications with the first UE, transmit an indication of a type of reference signal sequence to be included within transmissions of at least the first UE that use the π/2 BPSK modulation scheme, receive a transmission from at least the first UE that uses the π/2 BPSK modulation scheme and that includes a reference signal based on the indication of the type of reference signal sequence, and demodulate the transmission based on the reference signal.

Another apparatus for wireless communication at a base station is described. The apparatus may include means for establishing a connection with at least a first UE that uses a π/2 BPSK modulation scheme for at least a portion of wireless communications with the first UE, transmitting an indication of a type of reference signal sequence to be included within transmissions of at least the first UE that use the π/2 BPSK modulation scheme, receiving a transmission from at least the first UE that uses the π/2 BPSK modulation scheme and that includes a reference signal based on the indication of the type of reference signal sequence, and demodulating the transmission based on the reference signal.

A non-transitory computer-readable medium storing code for wireless communication at a base station is described. The code may include instructions executable by a processor to establish a connection with at least a first UE that uses a π/2 BPSK modulation scheme for at least a portion of wireless communications with the first UE, transmit an indication of a type of reference signal sequence to be included within transmissions of at least the first UE that use the π/2 BPSK modulation scheme, receive a transmission from at least the first UE that uses the π/2 BPSK modulation scheme and that includes a reference signal based on the indication of the type of reference signal sequence, and demodulate the transmission based on the reference signal.

In some examples of the method, apparatuses, and non-transitory computer-readable medium described herein, the indication of the type of reference signal sequence indicates a first type of reference signal sequence or a second type of reference signal sequence. In some examples of the method, apparatuses, and non-transitory computer-readable medium described herein, the second type of reference signal sequence may have a lower PAPR than the first type of reference signal. In some examples of the method, apparatuses, and non-transitory computer-readable medium described herein, the second type of reference signal sequence may be a power deboosted version of the first sequence. In some examples of the method, apparatuses, and non-transitory computer-readable medium described herein, the first type of reference signal sequence may be a ZC sequence and the second type of reference signal sequence may be a power deboosted ZC sequence or a π/2 BPSK DMRS sequence. In some examples of the method, apparatuses, and non-transitory computer-readable medium described herein, the indication of the type of reference signal sequence indicates the power deboosted ZC sequence and an amount of power deboosting to apply relative to data transmissions that use the π/2 BPSK modulation scheme.

In some examples of the method, apparatuses, and non-transitory computer-readable medium described herein, the indication of the type of reference signal sequence may be transmitted via RRC signaling. In some examples of the method, apparatuses, and non-transitory computer-readable medium described herein, the RRC signaling may be a cell-specific RRC transmission that indicates the type of reference signal sequence to be used by each UE in a cell served by the base station. In some examples of the method, apparatuses, and non-transitory computer-readable medium described herein, the cell-specific RRC transmission includes a SIB transmission, an OSI transmission, or a RMSI transmission. In some examples of the method, apparatuses, and non-transitory computer-readable medium described herein, the RRC signaling may be a UE-specific RRC transmission that indicates the type of reference signal sequence to be used by the first UE, and where one or more other UEs use a different type of reference signal sequence for transmissions that use the π/2 BPSK modulation scheme.

Some examples of the method, apparatuses, and non-transitory computer-readable medium described herein may further include operations, features, means, or instructions for receiving, from the first UE, a capability indication that indicates supported types of reference signals at the UE, and where the indication of the type of reference signal sequence may be transmitted to the first UE responsive to the capability indication. In some examples of the method, apparatuses, and non-transitory computer-readable medium described herein, the indication of the type of reference signal sequence provides an initial type of reference signal sequence, and the method, apparatuses, and non-transitory computer-readable medium described herein may further include operations, features, means, or instructions for receiving, from the first UE, a capability indication that indicates supported types of reference signals at the UE; selecting, responsive to the capability indication, the type of reference signal sequence to be included within transmissions that use the π/2 BPSK modulation scheme and transmitting a second indication to the first UE of a type of reference signal sequence to be included within transmissions of at least the first UE that use the π/2 BPSK modulation scheme, where one or more subsequent communications with the first UE may be based on the second indication.

DETAILED DESCRIPTION

Figure 1:
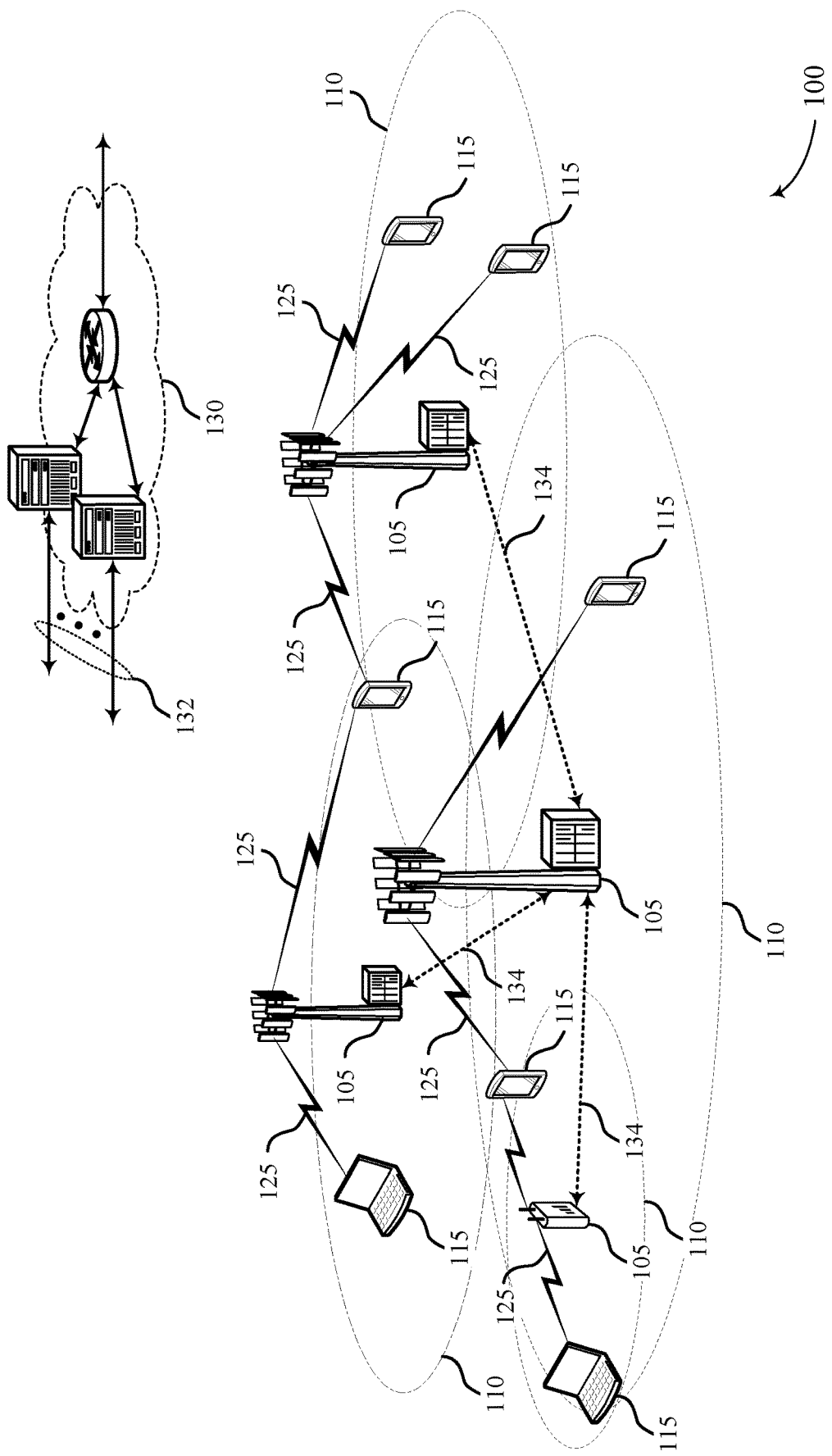
FIG. 1 illustrates an example of a system for wireless communications that supports reference signal sequence identification in wireless communications in accordance with aspects of the present disclosure.

In some wireless communications systems, a transmitter, such as a UE or a base station, may transmit one or more reference signals to provide a receiver, such as a UE or a base station, with an amplitude and a phase reference for performing channel estimation of a wireless channel. The receiver may use the channel estimate to remove amplitude and/or phase distortion to a signal caused by transmission of the signal via the wireless channel. In some LTE and NR systems, for example, a transmitter may generate a reference signal by performing quadrature phase shift keying (QPSK) modulation on a Zadoff-Chu (ZC) sequence. pilot tones that transport a QPSK-based reference signal may have a large peak to average power ratio (PAPR), and may not be suitable for use in some NR systems. Moreover, such reference signals may cause tones that transport reference signals to have a PAPR that may exceed a PAPR of tones that transport data.

In some cases, larger PAPRs or large differences in PAPRs between reference signal tones and data tones may cause a power amplifier (PA) at a UE to have a gain that is set according to the higher PAPR of the reference signal, which may result in data tones with lower gain. Further, in some 5G or NR systems, a π/2 binary phase shift keying (BPSK) modulation scheme may be implemented from some communications between a UE and a base station, in which the BPSK constellation of alternating tones is phase shifted by 90 degrees. Such techniques provide a lower PAPR relative to standard BPSK modulation. However, in cases where a reference signal that uses the ZC sequence is included with transmissions, the PAPR of the reference signal may result in reduced PA gain.

In some examples, in order to allow a receiving device to have higher PA gain, a second type of reference signal may be implemented in addition or alternatively to a first type of reference signal that includes a ZC sequence that is transmitted at a same power level as data tones. Thus, implementing the second type of reference signal may enhance reliability for transmissions of data tones due to being transmitted at higher gains. In some cases, different UEs may have different capabilities for transmitting and receiving the second type of reference signal. For example, UEs deployed in some NR systems may be capable of transmitting and receiving the first type of reference signal and not the second type of reference signal, while other UEs may be capable of transmitting and receiving both the first type of reference signal and the second type of reference signal.

Various aspects of the present disclosure provide techniques for indicating a reference signal to be used in demodulation of a π/2 BPSK modulation scheme for communications between the UE and the base station. In some cases, the base station may indicate whether the first type of reference signal or the second type of reference signal is to be transmitted. In some cases, the second type of reference signal may be a π/2 BPSK demodulation reference signal (DMRS) that has a reference signal sequence with a lower PAPR than the first type of reference signal (e.g., a ZC sequence). In other cases, the second type of reference signal sequence may be a power deboosted version of the first reference signal sequence (e.g., a power deboosted ZC sequence). The indication from the base station of the type of reference signal may be provided via radio resource control (RRC) signaling, such as a cell-specific RRC transmission that indicates the type of reference signal sequence to be used by each UE in a cell served by the base station (e.g., a system information block (SIB) transmission, an other system information (OSI) transmission, or a remaining minimum system information (RMSI) transmission), or a UE-specific RRC transmission provided to each UE.

In some cases, cell-specific RRC signaling may be used to establish an initial type of reference signal (e.g., the first type of reference signal) that is to be used by a UE and, after the UE reports a capability for different types of reference signals (e.g., via a physical uplink shared channel (PUSCH) transmission), the base station may transmit UE-specific RRC signaling that indicates a type of reference signal to use for one or more subsequent transmissions (e.g., an RRC reconfiguration may indicate which type of reference signal is to be used, a semi-persistent scheduling (SPS) grant may indicate a type of reference signal to use for SPS transmissions, etc.). If the indication from the UE-specific RRC is different than the initial type of reference signal, the indication from the UE-specific RRC may override the initial type of reference signal.

Aspects of the disclosure are initially described in the context of a wireless communications system. Aspects of the disclosure are further illustrated by and described with reference to apparatus diagrams, system diagrams, and flowcharts that relate to reference signal sequence identification in wireless communications.

FIG. 1 illustrates an example of a wireless communications system 100 that supports reference signal sequence identification in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may provide an indication of a reference signal to be used in demodulation of π/2 BPSK modulation scheme for communications between a UE 115 and the base station 105. In some cases, the base station 105 may indicate whether a first type of reference signal or a second type of reference signal is to be transmitted. In some cases, the second type of reference signal may be a specified π/2 BPSK DMRS that has a reference signal sequence that has a lower PAPR than the first type of reference signal (e.g., a ZC sequence). In other cases, the second type of reference signal sequence may be a power deboosted version of the first reference signal sequence (e.g., a power deboosted ZC sequence). The indication from the base station 105 of the type of reference signal may be provided via RRC signaling, such as a cell-specific RRC transmission that indicates the type of reference signal sequence to be used by each UE 115 in a cell served by the base station 105 (e.g., a SIB, OSI, or RMSI transmission), or a UE-specific RRC transmission provided to each UE 115. In some cases, an initial type of reference signal may be indicated by the base station 105 in cell-specific RRC signaling, which may be overridden for one or more UEs 115 using UE-specific RRC signaling.

Figure 2:
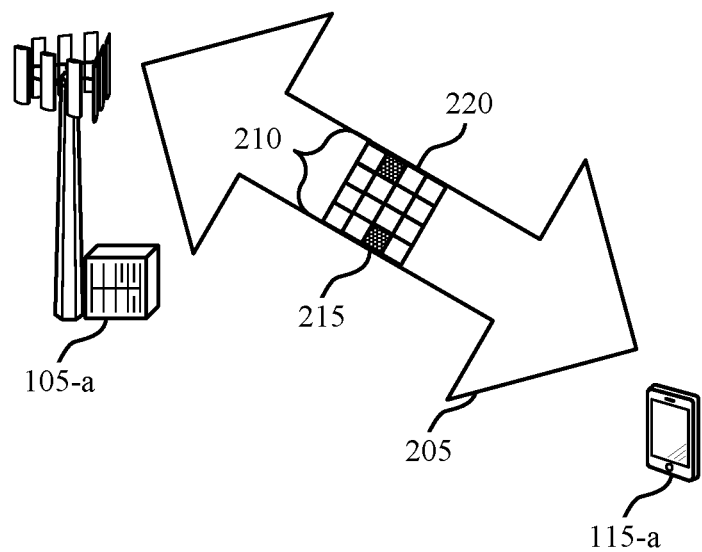
FIG. 2 illustrates an example of a portion of a wireless communications system that supports reference signal sequence identification in wireless communications in accordance with aspects of the present disclosure.

FIG. 2 illustrates an example of a wireless communications system 200 that supports reference signal sequence identification in wireless communications in accordance with aspects of the present disclosure. In some examples, wireless communications system 200 may implement aspects of wireless communications system 100. In this example, wireless communications system 200 includes UE 115-a and base station 105-a, which may be respective examples of a UE 115 and a base station 105 as described herein. UE 115-a and base station 105-a may communicate via a communication link 205. The communication link 205 may be configured for uplink and downlink transmissions.

UE 115-a and base station 105-a may implement techniques for π/2 BPSK modulation, which may enable transmission of reference signals and data using a common modulation scheme to achieve a desired PAPR (e.g., a low PAPR or a PAPR that is less than a PAPR threshold). In some examples, UE 115-a and base station 105-a may use π/2 BPSK modulation and the base station 105-a may indicate a reference signal that the UE 115-a is to use for π/2 BPSK transmissions. As described above, in some cases the base station 105-a may indicate that a first type of reference signal or a second type of reference signal is to be used for DMRS transmissions.

In some examples, base station 105-a may allocate one or more resource blocks to the UE 115-a from a system bandwidth for an uplink or downlink transmission. The system bandwidth may be divided into a set of resource blocks that may be allocated for uplink and/or downlink transmission. A time duration of the resource block may correspond to a transmission time interval (TTI) (e.g., a mini-slot, a slot, a subframe, a frame, or the like), and the base station 105-a may allocate the resource blocks to one or more UEs 115 of the wireless communications system 100 in each TTI. In some examples, a resource block may correspond to a defined number of symbol periods and a defined number of subcarriers of a carrier. A resource block may correspond to a set of resource elements, and a resource element may include one subcarrier and one symbol period. Each subcarrier may be a radio frequency used for symbol modulation and may be spaced apart from one another in frequency by a fixed amount. In some examples, a resource block may be the smallest set of time-frequency resources that may be allocated to a UE 115.

Base station 105-a may determine a resource block allocation 210 for UE 115-a. Base station 105-a may determine which resource blocks, and corresponding REs and subcarriers, within the system bandwidth to allocate to UE 115-a for carrying a reference signal and an uplink or downlink data transmission. In some examples, the resource block allocation 210 may include a small number of resource blocks, for example including two, three, or four resource blocks, or any number of resource blocks less than or equal to a threshold number of resource blocks (e.g., that satisfies a resource block threshold). In some examples, the techniques described herein may be used for small length π/2 BPSK DMRS sequence.

In some cases, UE 115-a may transmit or receive a reference signal 215 and a data transmission 220 within resource block allocation 210, where the reference signal 215 may be communicated using a first subset of the resource elements of the resource block allocation 210 and the data transmission 220 may be communicated using a second subset of the resource elements of the resource block allocation 210. The reference signal 215 may be used to generate a channel estimate to enable a receiver to correct amplitude and/or phase distortion of the data transmission 220 caused by the wireless channel.

For an uplink data transmission, UE 115-a may transmit, to the base station 105-a, a reference signal 215 and the uplink data transmission within resource block allocation 210, where the reference signal 215 may be communicated using a first subset of the resource elements of the resource block allocation 210 and the uplink data transmission may be communicated using a second subset of the resource elements of the resource block allocation 210.

For a downlink data transmission, UE 115-a may receive, from the base station 105-a, a reference signal 215 and the downlink data transmission within resource block allocation 210, where the reference signal 215 may be communicated using a first subset of the resource elements of the resource block allocation 210 and the downlink data transmission may be communicated using a second subset of the resource elements of the resource block allocation 210.

Base station 105-a may transmit, to UE 115-a, a grant indicating the resource block allocation 210. A grant may identify which resource blocks within the available system bandwidth are allocated to UE 115-a for an uplink and/or downlink data transmission. In some examples, the grant may indicate a bit sequence length of a bit sequence used to generate the reference signal 215. In another example, UE 115-a may determine a length of the bit sequence based on the number of allocated resource blocks.

In cases where the reference signal 215 is based on a ZC sequence transmitted at a same power as data transmission 220, the base station 105-a may indicate to the UE 115-a, and to other UEs 115 within the coverage area of the base station 105-a, that a first type of reference signal is to be transmitted for π/2 BPSK transmissions. In some cases, the UE 115-a may transmit a capability indication that indicates whether the UE 115-a is capable of using other types of reference signals, such as a π/2 BPSK DMRS or a power deboosted reference signal based on a ZC sequence. Based on the capability indication, the base station 105-a may indicate to the UE 115-a that the first type of reference signal or the second type of reference signal is to be transmitted. If the UE 115-a is signaled (e.g., via a modulation and coding scheme (MCS) indication in a downlink control information (DCI) transmission) that a resource allocation is associated with π/2 BPSK transmissions, the UE 115-a may then generate the reference signal 215 according to the indicated first type of reference signal or second type of reference signal.

In some examples, the second type of reference signal may be based on a π/2 BPSK DMRS sequence. In other examples, the second type of reference signal may be based on a same ZC sequence of the first type of reference signal, but the transmission power of the reference signal 215 may be deboosted by X dB (e.g., X=1, where the value of X may also be indicated with the indication of the second type of reference signal) with respect to data transmissions 220.

In some cases, as described above, the base station 105-a may use RRC signaling to indicate to the UE 115-a whether the first type of reference signal or the second type of reference signal is to be used for shared channel transmissions (e.g., PUSCH transmissions). Such RRC signaling may be, in some cases, a cell-specific RRC transmission such as SIB transmissions or either of an OSI or RMSI transmission. For example, the base station 105-a may use a SIB, OSI, or RMSI transmission to indicate to UE 115-a (and all other UEs 115 served by the base station 105-a) that the first type of reference signal is to be used. In such cases, even though the UE 115-a may be capable of using the second type of reference signal, the UE 115-a may use the first type of reference signal for π/2 BPSK transmissions. In some cases, if one or more UEs 115 served by the base station 105-a are not capable of using the second type of reference signal, the base station 105-a may signal to all served UEs 115 to use the first type of reference signal. In other cases, after the UE 115-a reports its capability, the base station 105-a may use UE-specific RRC to indicate that the second type of reference signal is to be used by the UE 115-a. In such UE-specific signaling cases, the base station 105-a may configure some UEs 115 to use the first type of reference signal and other UEs 115 to use the second type of reference signal. In some cases, if the UE 115-a is capable of using the first type of reference signal (e.g., and not capable of using the second type of reference signal), the base station 105-a may not send any RRC signaling that indicates a type of reference signal, such that the UE 115-a may use the first type of reference signal.

In some cases, cell-specific RRC may be used to establish an initial type of reference signal (e.g., the first type of reference signal) that is to be used by UE 115-a and, after the UE 115-a reports a capability for different types of reference signals (e.g., via a PUSCH transmission), the base station 105-a may transmit UE-specific RRC signaling that indicates which type of reference signal to use for one or more subsequent transmissions (e.g., an RRC reconfiguration may indicate which type of reference signal is to be used, a SPS grant may indicate a type of reference signal to use for SPS transmissions, etc.). If the indication from the UE-specific RRC is different than the initial type of reference signal, the indication from the UE-specific RRC may override the initial type of reference signal.

Figure 3:
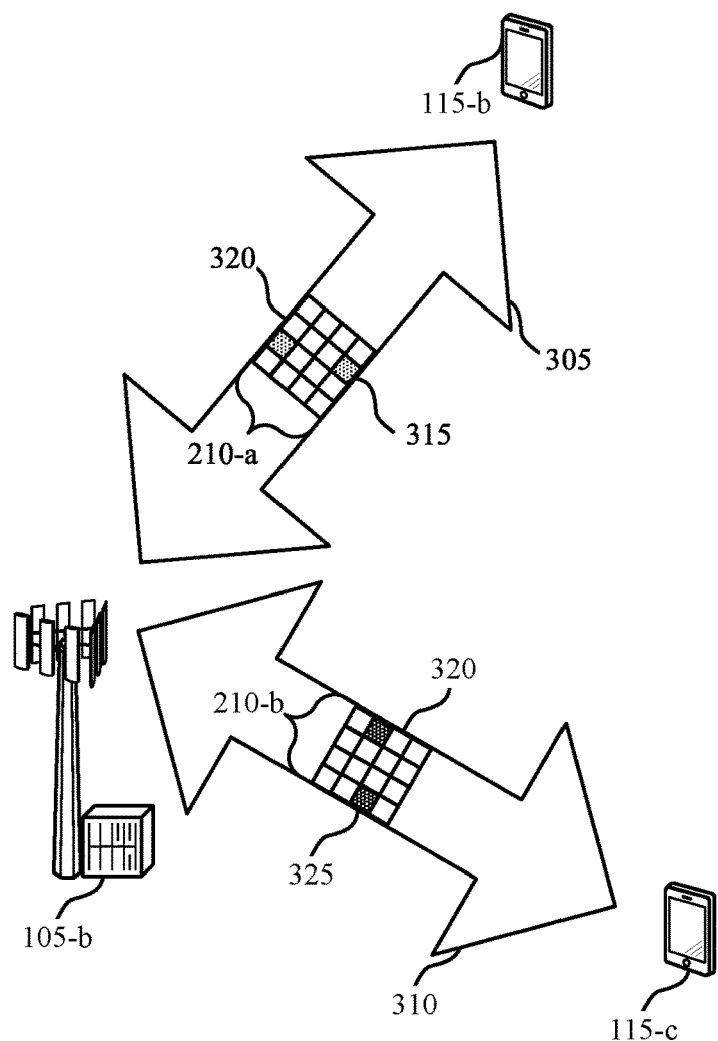
FIG. 3 illustrates another example of a wireless communications system that supports reference signal sequence identification in wireless communications in accordance with aspects of the present disclosure.
Figure 3:
Figure 3:
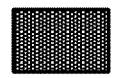
Figure 3:

FIG. 3 illustrates an example of a wireless communications system 300 that supports reference signal sequence identification in wireless communications in accordance with aspects of the present disclosure. In some examples, wireless communications system 300 may implement aspects of wireless communications system 100. In this example, wireless communications system 300 includes a first UE 115-b, a second UE 115-b, and a base station 105-b, which may be respective examples of a UE 115 and a base station 105 as described herein. First UE 115-b and base station 105-b may communicate via a communication link 305 and second UE 115-c and base station 105-b may communicate via a communication link 310. Similarly as discussed with respect to FIG. 2, communication links 305 and 310 may be configured for uplink and downlink transmission.

In this example, the base station 105-b may use UE-specific RRC signaling to indicate a first type of reference signal and a second type of reference signal that is to be used by UEs 115-b and 115-c for π/2 BPSK transmissions. In this case, communication link 305 with the first UE 115-b may use a first type of reference signal 315, which may have a higher PAPR relative to data transmissions 320 of resource block allocation 210-a. Communication link 310 with the second UE 115-c may use a second type of reference signal 325, which may have a similar or lower PAPR as data transmissions 320 of resource block allocation 210-b. In some examples, UEs 115-b and 115-c and base station 105-b may use π/2 BPSK modulation and the base station 105-b may signal a reference signal that the UE 115-c is to use for π/2 BPSK transmissions. As indicated above, in some cases the second UE 115-c may transmit a capability indication to the base station 105-b, indicating a capability with reference to the second type of reference signal 325, and the base station 105-*b* may provide an indication via RRC signaling that the second UE 115-*c* is to use the first type of reference signal or the second type of reference signal. Also, as indicated above, in some cases the base station 105-*b* may provide an initial indication to the second UE 115-*c* that the first type of reference signal 315 is to be used and, upon receiving capability information that the second UE 115-*c* is capable of using the second type of reference signal 325, may transmit UE-specific signaling to the second UE 115-*c*, indicating for the UE 115-*c* to use the second type of reference signal 325.

As discussed above, in some cases the base station 105-*b* may transmit an indication to use a second type of reference signal 325. Such reference signals may provide lower power transmissions, or lower PAPR. In some cases, the second reference signal 325 may be a power deboosted version of the first reference signal 315. In other cases, the second reference signal 325 may be π/2 BPSK DMRS in which a length of a bit sequence of the second reference signal 325 may correspond to a number of allocated resource blocks within which data and the reference signal are to be transmitted. In such examples, base station 105-*b* and second UE 115-*c* may each store a set of tables that each includes sets of bit sequences that may be used to generate the second reference signal 325, and the second reference signal 325 may be generated based on a table of the set of tables that corresponds to the resource block allocation 210-*b*.

Figure 4:
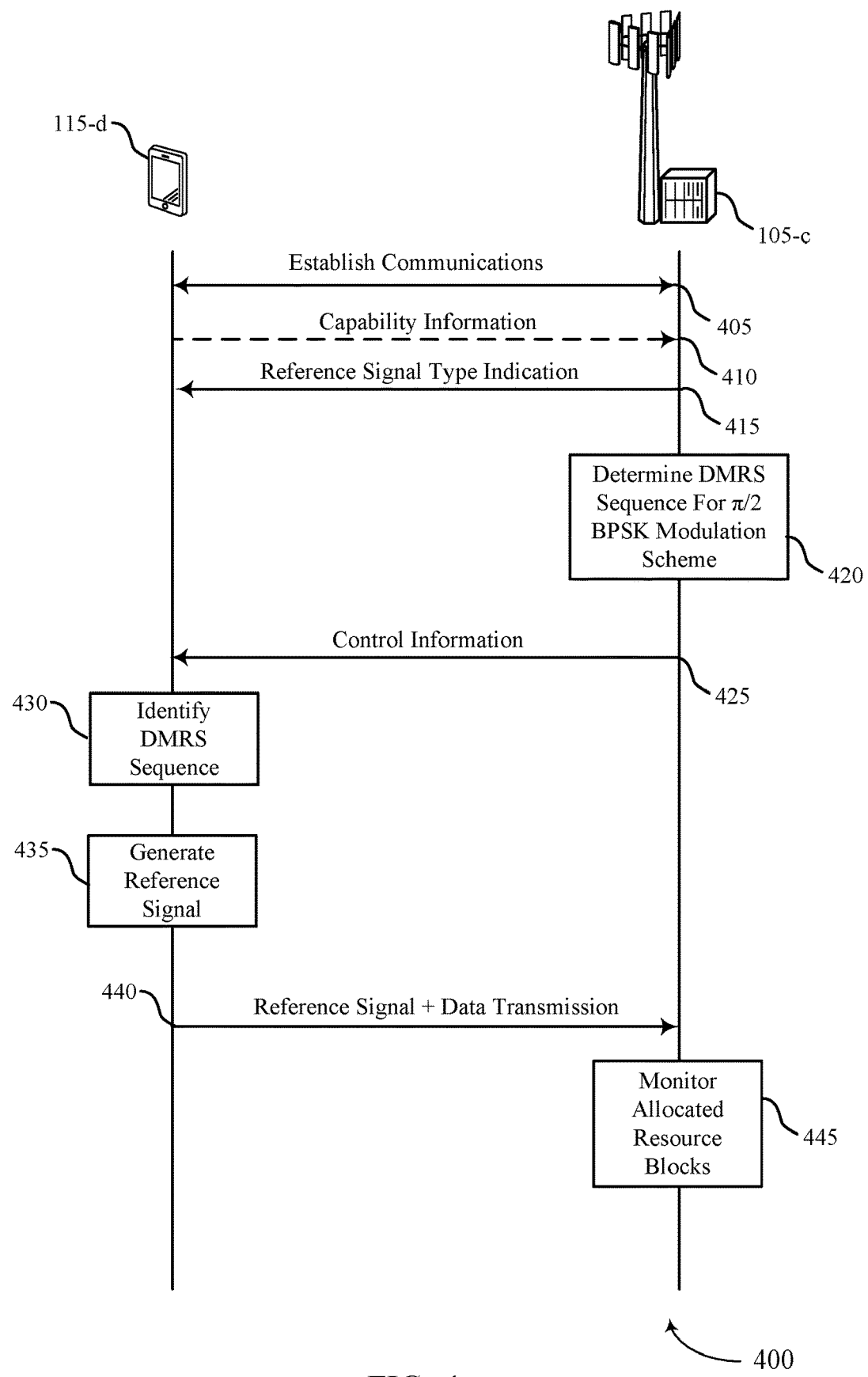
FIG. 4 illustrates an example of a process flow that supports reference signal sequence identification in wireless communications in accordance with aspects of the present disclosure.

FIG. 4 illustrates an example of a process flow 400 that supports reference signal sequence identification in wireless communications in accordance with aspects of the present disclosure. In some examples, process flow 400 may implement aspects of wireless communications system 100, 200, or 300. Process flow 400 may include UE 115-*d* and base station 105-*c*, which may be respective examples of a UE 115 and a base station 105 as described herein. Process flow 400 may implement techniques for signaling an uplink reference signal using π/2 BPSK modulation.

At 405, UE 115-*d* and base station 105-*c* may establish communications (e.g., establish a connection). In some cases, during connection establishment (e.g., RRC connection establishment or RRC connection reconfiguration), base station 105-*c* may semi-statically configure UE 115-*d* with a type of reference signal for use in π/2 BPSK modulation communications. In some cases, an initial type of reference signal may be configured via cell-specific RRC signaling.

At 410, UE 115-*d* may, in some cases, transmit a capability indication to the base station 105-*c* that may indicate whether the UE 115-*d* is capable of using different types of reference signals for π/2 BPSK transmissions. In some cases, the capability indication may be provided via RRC signaling as part of the connection establishment. In some cases, the base station 105-*c* may transmit a separate capability request to the UE 115-*d*, and the capability indication may be provided responsive to the capability request (e.g., via PUSCH). The capability indication may be an explicit indication provided by the UE 115-*d*, or may be an implicit indication based on one or more other capabilities of the UE 115-*d* (e.g., a capability of the UE 115-*d* to perform one or more advanced features, such as those associated with a newer release of a radio communications standard).

At 415, the base station 105-*c* may transmit a reference signal type indication to the UE 115-*d*. In some cases, the reference signal type indication may indicate whether the UE 115-*d* is to use a first type of reference signal or a second type of reference signal. The first type of reference signal may be based on a ZC sequence and may be transmitted at a same power level as data transmissions. In some cases, the second type of reference signal may be a power deboosted reference signal that is based on the ZC sequence that is transmitted at a lower power level than the data transmissions. In such cases, the reference signal type indication may also indicate an amount of power deboosting that is to be used (e.g., a 1 dB power reduction for DMRS transmissions). In some cases, the second type of reference signal may be based on π/2 BPSK DMRS sequence that has a lower PAPR than the ZC sequence, which may have a similar PAPR to data transmissions within a resource allocation.

At 420, base station 105-*c* may determine a DMRS sequence for π/2 BPSK modulation transmissions. In some cases, as discussed above, the base station 105-*c* may determine to use a power deboosted version of a reference signal based on a ZC sequence, and the DMRS sequence may be the power deboosted version of ZC sequence. In other cases, the base station 105-*c* may determine a bit sequence length corresponding to the number of allocated resource blocks, identify a bit sequence table from the set of bit sequence tables based on the determined bit sequence length, and select a bit sequence from a set of bit sequences in the identified bit sequence table.

At 425, base station 105-*c* may transmit control information to UE 115-*d* indicating the number of allocated resource blocks. In some cases, the control information may indicate a type of reference signal to be used for DMRS transmissions of the UE 115-*d*. In an example, the control information may include a grant allocating a set of resource blocks to the UE 115-*d* for transmitting a reference signal and an uplink data transmission to the base station 105-*c*. In some cases, the control information may include the index value for the identified bit sequence table to indicate which bit sequence of the set of bit sequences to use from the bit sequence table for the π/2 BPSK DMRS sequence. In some cases, base station 105-*c* may signal the bit sequence length to UE 115-*d* (e.g., in the grant or other DCI), or UE 115-*d* may determine the bit sequence length based on the number of allocated resource blocks (e.g., a bit sequence length may be a function of the number of allocated resource blocks).

At 430, UE 115-*d* may determine the DMRS sequence. In cases where the base station 105-*c* indicates that a power deboosted reference signal is to be transmitted, the UE may determine the DMRS sequence based on a ZC sequence. In cases where the base station 105-*c* indicates that π/2 BPSK DMRS sequence is to be used, the UE 115-*d* may identify a π/2 BPSK DMRS sequence. In some cases, the UE 115-*d* may identify the π/2 BPSK DMRS sequence based on a resource block allocation and an index value provided with the control information. In an example, the UE 115-*d* may process the control information to identify the set of allocated resource blocks and the number of allocated resource blocks and UE 115-*d* may determine the bit sequence length corresponding to the number of allocated resource blocks.

At 435, UE 115-*d* may generate the reference signal. In some cases, the reference signal may be generated by modulating the identified reference signal sequence according to π/2 BPSK modulation scheme. In cases where the base station 105-*c* provides an initial type of reference signal, if the reference signal type indication is different than the initial type reference signal, the UE 115-*d* may switch the type of reference signal in accordance with the reference signal type indication.

At 440, UE 115-*d* may transmit the reference signal and the uplink data transmission to base station 105-*c* within the allocated resource blocks. The reference signal may be, for example a DMRS. In cases where the second type of reference signal is a π/2 BPSK DMRS, a PAPR of tones of the uplink data transmission transporting the modulated data bit sequence within the allocated resource blocks may satisfy a PAPR threshold, and a PAPR of tones transporting the reference signal within the allocated resource blocks may have a similar or lower PAPR. Therefore, the reference signal and data may use a same modulation scheme resulting in a low PAPR for both the reference signal and the uplink data transmission.

At 445, base station 105-*c* may monitor the allocated resource blocks for the reference signal and the uplink data transmission. Base station 105-*c* may receive the reference signal within the allocated resource blocks for estimating amplitude and/or phase distortion introduced to the uplink data transmission by the wireless channel. Base station 105-*c* may remove the amplitude and/or phase distortion during decoding of the uplink data transmission based on the received reference signal. In some cases, the wireless channel may introduce delay to the reference signal, and each bit sequence used to generate the reference signal may be orthogonal to at least one delayed version of the same bit sequence to distinguish multipath interference.

Figure 5:
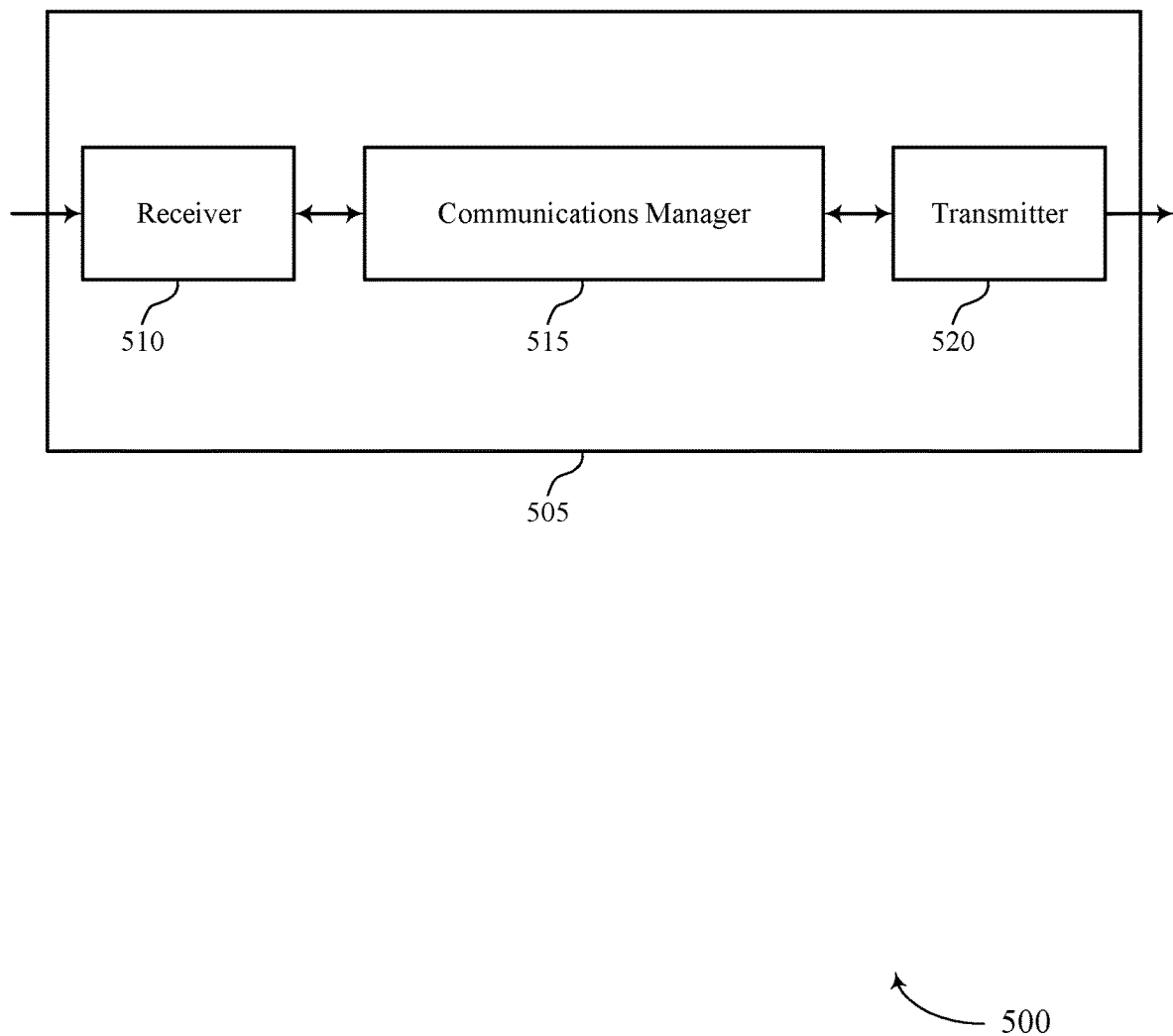
FIGS. 5 and 6 show block diagrams of devices that support reference signal sequence identification in wireless communications in accordance with aspects of the present disclosure.

FIG. 5 shows a block diagram 500 of a device 505 that supports reference signal sequence identification in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal sequence identification in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a connection with a base station that uses a π/2 BPSK modulation scheme for at least a portion of wireless communications with the base station, receive, from the base station, an indication of a type of reference signal sequence to be included within transmissions that use the π/2 BPSK modulation scheme, generate a reference signal based on the indication of the type of reference signal sequence, and transmit the reference signal within communications that use the π/2 BPSK modulation scheme. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
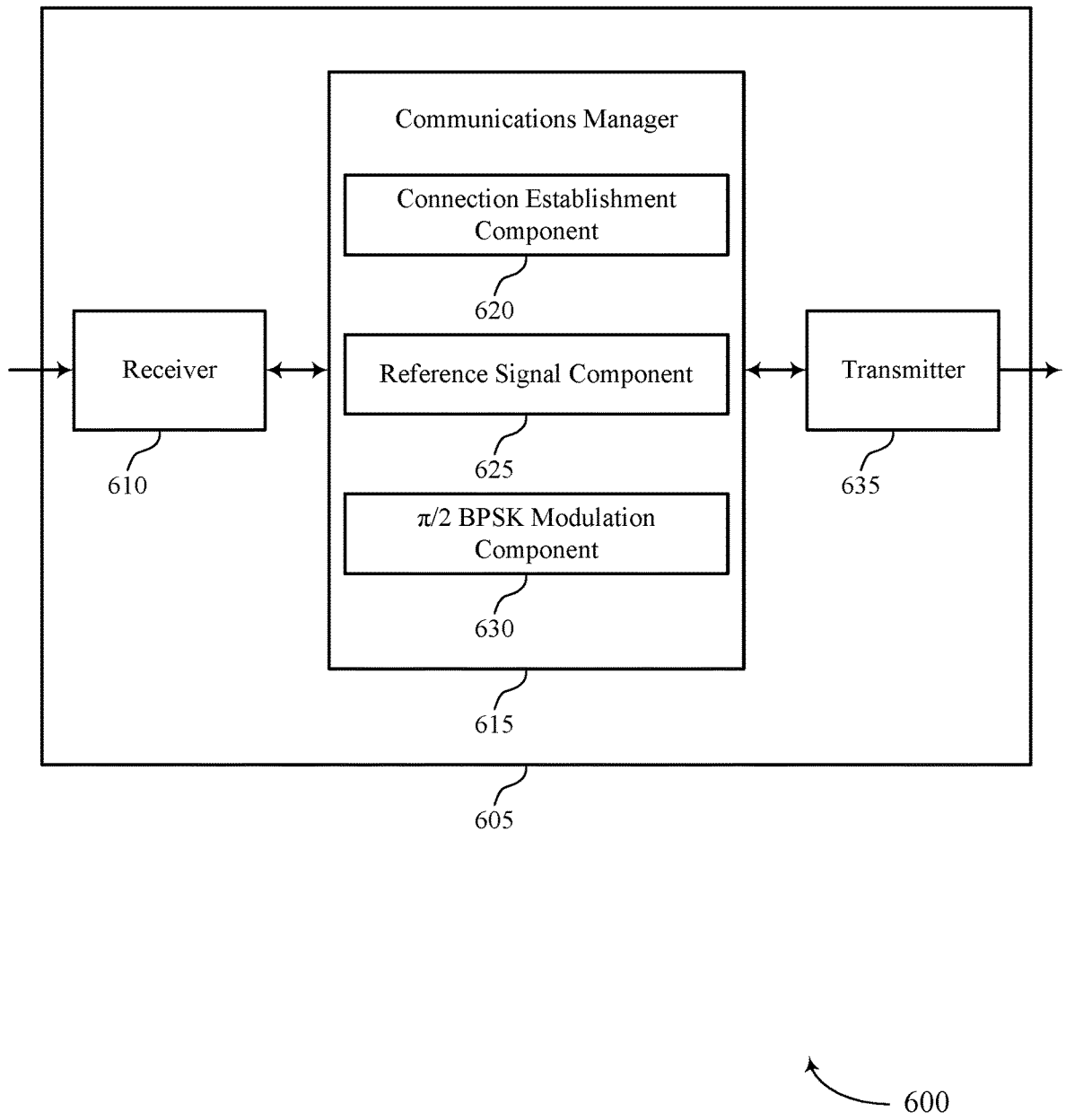

FIG. 6 shows a block diagram 600 of a device 605 that supports reference signal sequence identification in wireless communications in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to reference signal sequence identification in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection establishment component 620, a reference signal component 625, and a π/2 BPSK modulation component 630. The communications manager 615 may be an example of aspects of the communications manager 810 described herein.

The connection establishment component 620 may establish a connection with a base station that uses a π/2 BPSK modulation scheme for at least a portion of wireless communications with the base station.

The reference signal component 625 may receive, from the base station, an indication of a type of reference signal sequence to be included within transmissions that use the π/2 BPSK modulation scheme and generate a reference signal based on the indication of the type of reference signal sequence.

The π/2 BPSK modulation component 630 may transmit the reference signal within communications that use the π/2 BPSK modulation scheme.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
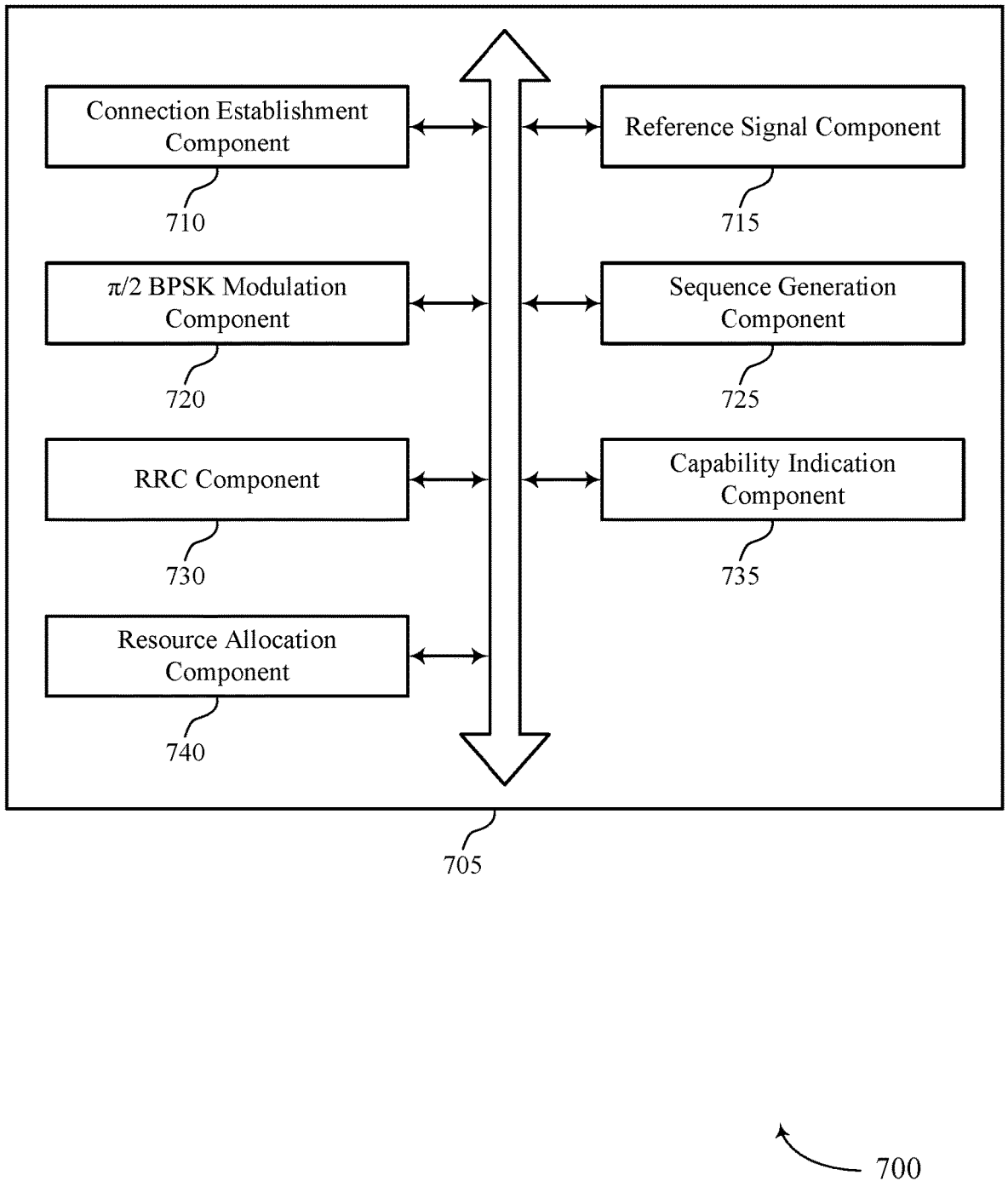
FIG. 7 shows a block diagram of a communications manager that supports reference signal sequence identification in wireless communications in accordance with aspects of the present disclosure.

FIG. 7 shows a block diagram 700 of a communications manager 705 that supports reference signal sequence identification in wireless communications in accordance with aspects of the present disclosure. The communications manager 705 may be an example of aspects of a communications manager 515, a communications manager 615, or a communications manager 810 described herein. The communications manager 705 may include a connection establishment component 710, a reference signal component 715, a π/2 BPSK modulation component 720, a sequence generation component 725, an RRC component 730, a capability indication component 735, and a resource allocation component 740. Each of these modules may communicate, directly or indirectly, with one another (e.g., via one or more buses).

The connection establishment component 710 may establish a connection with a base station that uses a π/2 BPSK modulation scheme for at least a portion of wireless communications with the base station.

The reference signal component 715 may receive, from the base station, an indication of a type of reference signal sequence to be included within transmissions that use the π/2 BPSK modulation scheme. In some examples, the reference signal component 715 may generate a reference signal based on the indication of the type of reference signal sequence. In some examples, the reference signal component 715 may determine a bit sequence length for the reference signal corresponding to the number of allocated resource blocks. In some examples, the reference signal component 715 may generate the reference signal based on a bit sequence having the bit sequence length.

In some cases, the indication of the type of reference signal sequence indicates a first type of reference signal sequence or a second type of reference signal sequence. In some cases, the second type of reference signal sequence has a lower PAPR than the first type of reference signal sequence. In some cases, the second type of reference signal sequence is a power deboosted version of the first sequence. In some cases, the indication of the type of reference signal sequence indicates the power deboosted ZC sequence and an amount of power deboosting to apply relative to data transmissions that use the π/2 BPSK modulation scheme.

The π/2 BPSK modulation component 720 may transmit the reference signal within communications that use the π/2 BPSK modulation scheme.

The sequence generation component 725 may generate a reference signal sequence. In some cases, the first type of reference signal sequence is a ZC sequence. In some cases, the second type of reference signal sequence is a power deboosted ZC sequence. In other cases, the second type of reference signal sequence is a π/2 BPSK DMRS sequence.

The RRC component 730 may transmit and receive RRC signaling from a base station. In some cases, the indication of a type of reference signal to use for π/2 BPSK DMRS transmissions is received via RRC signaling. In some cases, the RRC signaling is a cell-specific RRC transmission that indicates the type of reference signal sequence to be used by each UE in a cell served by the base station. In some cases, the cell-specific RRC transmission includes a SIB transmission or either an OSI or RMSI transmission from the base station. In some cases, the RRC signaling is a UE-specific RRC transmission that indicates the type of reference signal sequence to be used by the UE.

The capability indication component 735 may transmit a capability indication to the base station that indicates supported types of reference signals at the UE, and where the indication of the type of reference signal is received responsive to the capability indication.

The resource allocation component 740 may identify a set of allocated resource blocks and a number of the allocated resource blocks for at least a first transmission using the π/2 BPSK modulation scheme.

Figure 8:
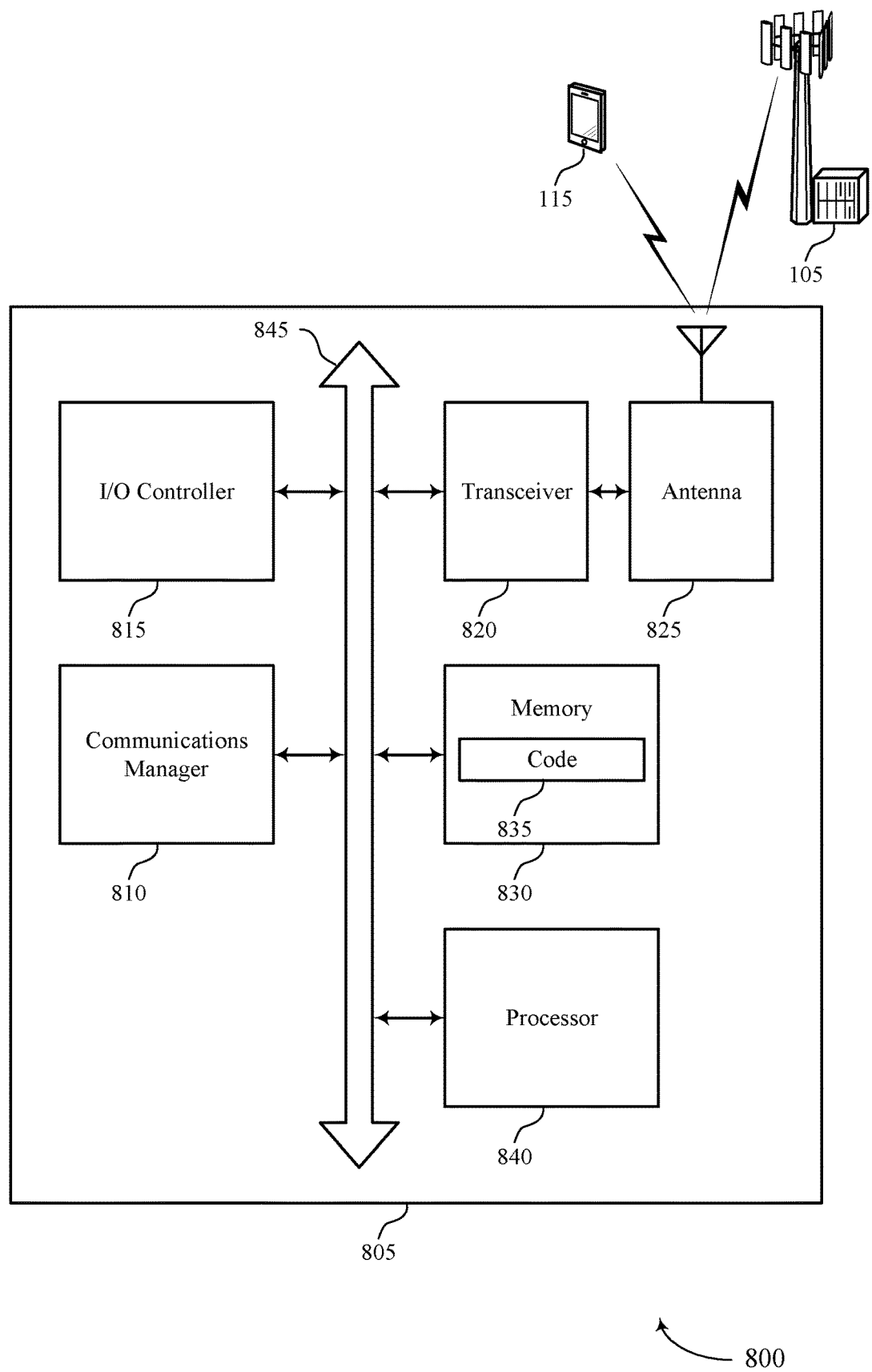
FIG. 8 shows a diagram of a system including a device that supports reference signal sequence identification in wireless communications in accordance with aspects of the present disclosure.

FIG. 8 shows a diagram of a system 800 including a device 805 that supports reference signal sequence identification in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a connection with a base station that uses a π/2 BPSK modulation scheme for at least a portion of wireless communications with the base station, receive, from the base station, an indication of a type of reference signal sequence to be included within transmissions that use the π/2 BPSK modulation scheme, generate a reference signal based on the indication of the type of reference signal sequence, and transmit the reference signal within communications that use the π/2 BPSK modulation scheme.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal sequence identification in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
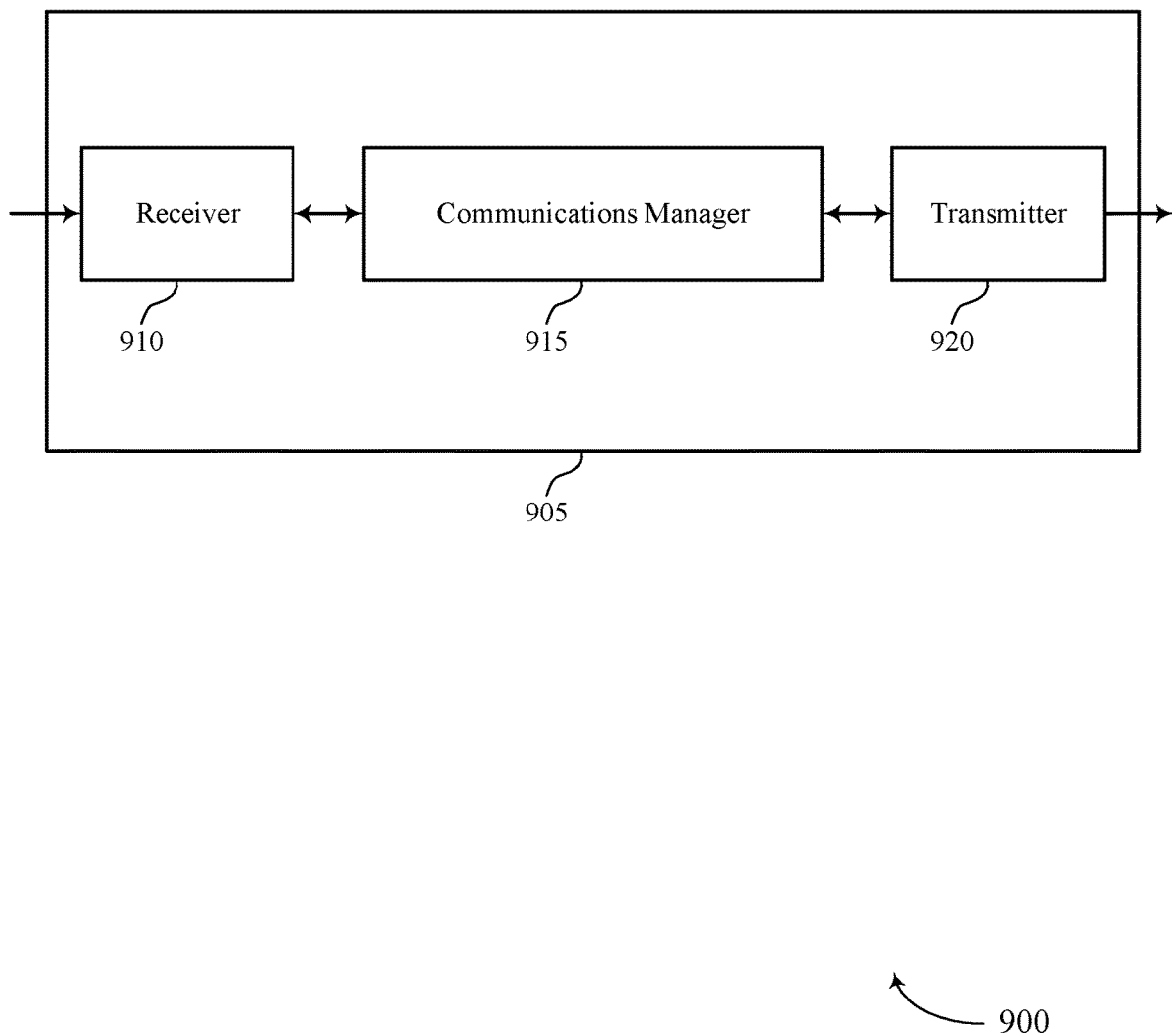
FIGS. 9 and 10 show block diagrams of devices that support reference signal sequence identification in wireless communications in accordance with aspects of the present disclosure.

FIG. 9 shows a block diagram 900 of a device 905 that supports reference signal sequence identification in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal sequence identification in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a connection with at least a first UE that uses π/2 BPSK modulation scheme for at least a portion of wireless communications with the first UE, transmit an indication of a type of reference signal sequence to be included within transmissions of at least the first UE that use the π/2 BPSK modulation scheme, receive a transmission from at least the first UE that uses the π/2 BPSK modulation scheme and that includes a reference signal based on the indication of the type of reference signal sequence, and demodulate the transmission based on the reference signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
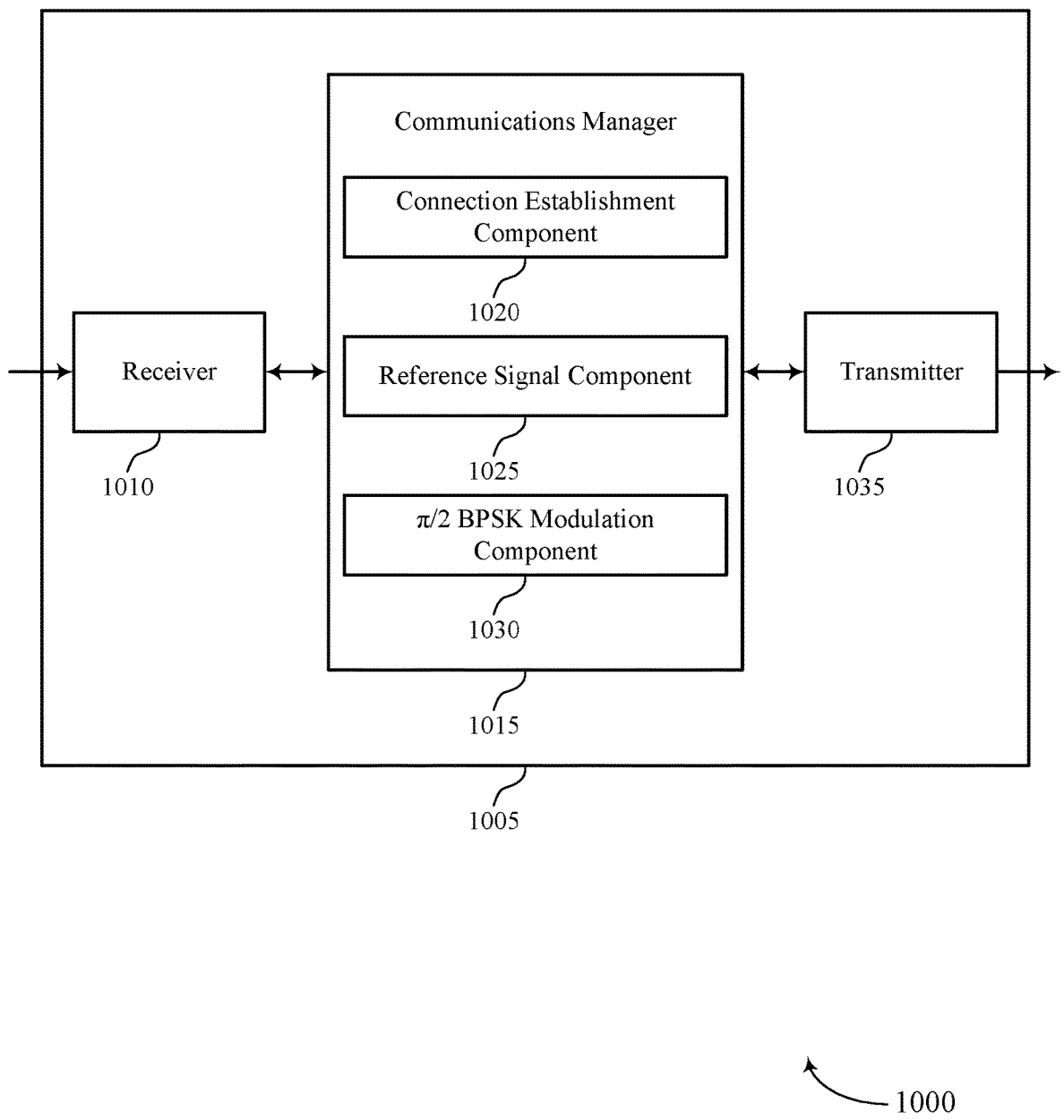

FIG. 10 shows a block diagram 1000 of a device 1005 that supports reference signal sequence identification in wireless communications in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal sequence identification in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment component 1020, a reference signal component 1025, and a π/2 BPSK modulation component 1030. The communications manager 1015 may be an example of aspects of the communications manager 1210 described herein.

The connection establishment component 1020 may establish a connection with at least a first UE that uses a π/2 BPSK modulation scheme for at least a portion of wireless communications with the first UE.

The reference signal component 1025 may transmit an indication of a type of reference signal sequence to be included within transmissions of at least the first UE that use the π/2 BPSK modulation scheme and receive a transmission from at least the first UE that uses the π/2 BPSK modulation scheme and that includes a reference signal based on the indication of the type of reference signal sequence.

The π/2 BPSK modulation component 1030 may demodulate the transmission based on the reference signal.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
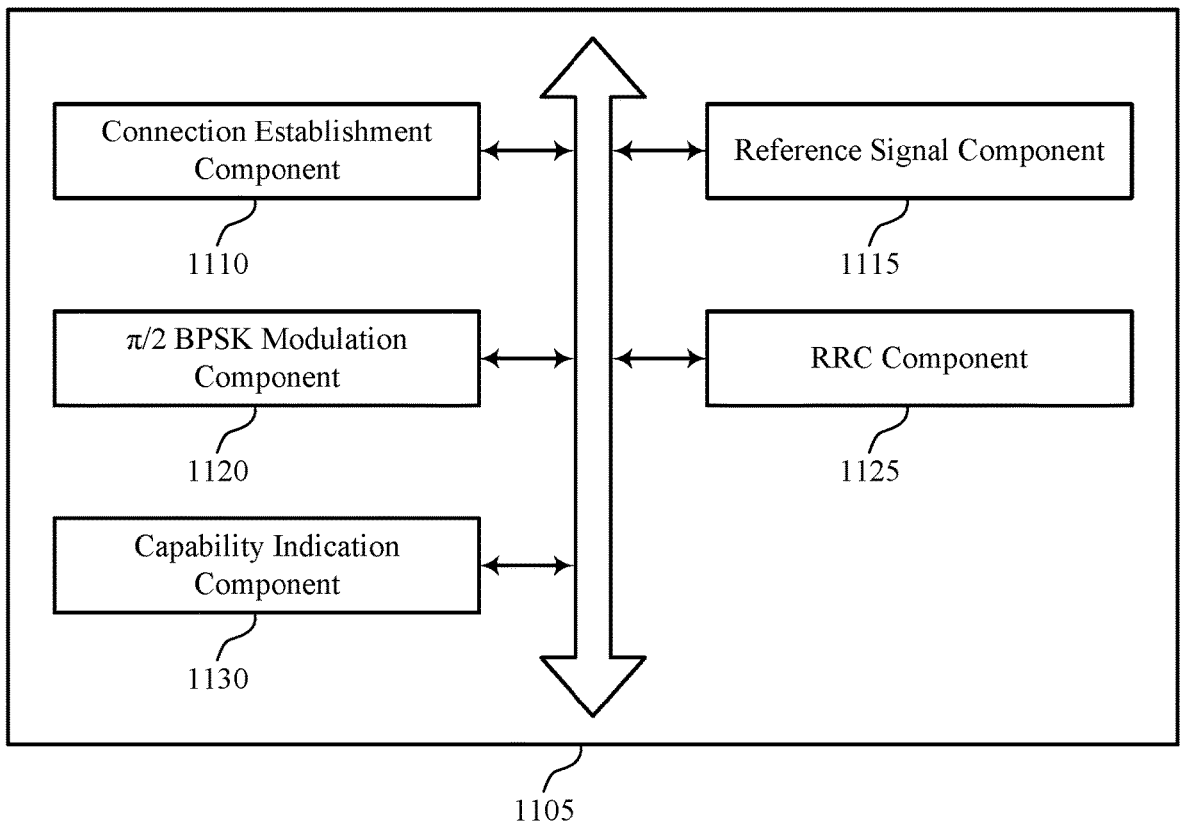
FIG. 11 shows a block diagram of a communications manager that supports reference signal sequence identification in wireless communications in accordance with aspects of the present disclosure.

FIG. 11 shows a block diagram 1100 of a communications manager 1105 that supports reference signal sequence identification in wireless communications in accordance with aspects of the present disclosure. The communications manager 1105 may be an example of aspects of a communications manager 915, a communications manager 1015, or a communications manager 1210 described herein. The communications manager 1105 may include a connection establishment component 1110, a reference signal component 1115, a π/2 BPSK modulation component 1120, an RRC component 1125, and a capability indication component 1130. Each of these modules may communicate, directly or indirectly, with one another (e.g., via one or more buses).

The connection establishment component 1110 may establish a connection with at least a first UE that uses a π/2 BPSK modulation scheme for at least a portion of wireless communications with the first UE.

The reference signal component 1115 may transmit an indication of a type of reference signal sequence to be included within transmissions of at least the first UE that use the π/2 BPSK modulation scheme. In some examples, the reference signal component 1115 may receive a transmission from at least the first UE that uses the π/2 BPSK modulation scheme and that includes a reference signal based on the indication of the type of reference signal sequence.

In some cases, the indication of the type of reference signal sequence indicates a first type of reference signal sequence or a second type of reference signal sequence. In some cases, the second type of reference signal sequence has a lower PAPR than the first type of reference signal. In some cases, the second type of reference signal sequence is a power deboosted version of the first sequence. In some cases, the first type of reference signal sequence is a ZC sequence. In some cases, the second type of reference signal sequence is a power deboosted ZC sequence or a π/2 BPSK DMRS sequence. In some cases, the indication of the type of reference signal sequence indicates the power deboosted ZC sequence and an amount of power deboosting to apply relative to data transmissions that use the π/2 BPSK modulation scheme.

The π/2 BPSK modulation component 1120 may demodulate the transmission based on the reference signal.

The RRC component 1125 may transmit and receive RRC signaling. In some cases, the indication of the type of reference signal sequence is transmitted via RRC signaling. In some cases, the RRC signaling is a cell-specific RRC transmission that indicates the type of reference signal sequence to be used by each UE in a cell served by the base station. In some cases, the cell-specific RRC transmission includes a SIB transmission, an OSI transmission, or an RMSI transmission. In some cases, the RRC signaling is a UE-specific RRC transmission that indicates the type of reference signal sequence to be used by the first UE, and where one or more other UEs use a different type of reference signal sequence for transmissions that use the π/2 BPSK modulation scheme.

The capability indication component 1130 may receive, from the first UE, a capability indication that indicates supported types of reference signals at the UE, and where the indication of the type of reference signal sequence is transmitted to the first UE responsive to the capability indication.

Figure 12:
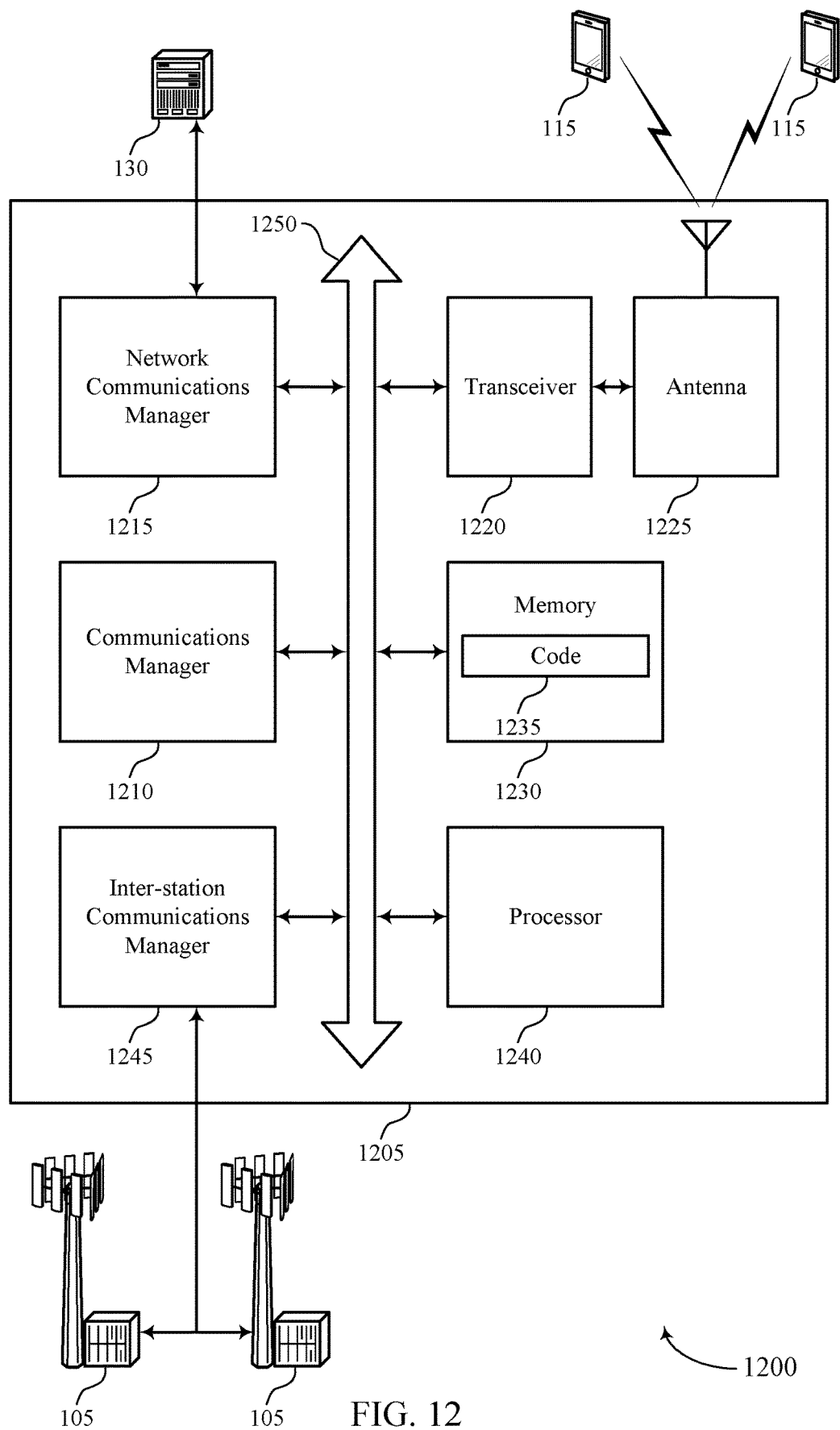
FIG. 12 shows a diagram of a system including a device that supports reference signal sequence identification in wireless communications in accordance with aspects of the present disclosure.

FIG. 12 shows a diagram of a system 1200 including a device 1205 that supports reference signal sequence identification in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a connection with at least a first UE that uses a π/2 BPSK modulation scheme for at least a portion of wireless communications with the first UE, transmit an indication of a type of reference signal sequence to be included within transmissions of at least the first UE that use the π/2 BPSK modulation scheme, receive a transmission from at least the first UE that uses the π/2 BPSK modulation scheme and that includes a reference signal based on the indication of the type of reference signal sequence, and demodulate the transmission based on the reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting reference signal sequence identification in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
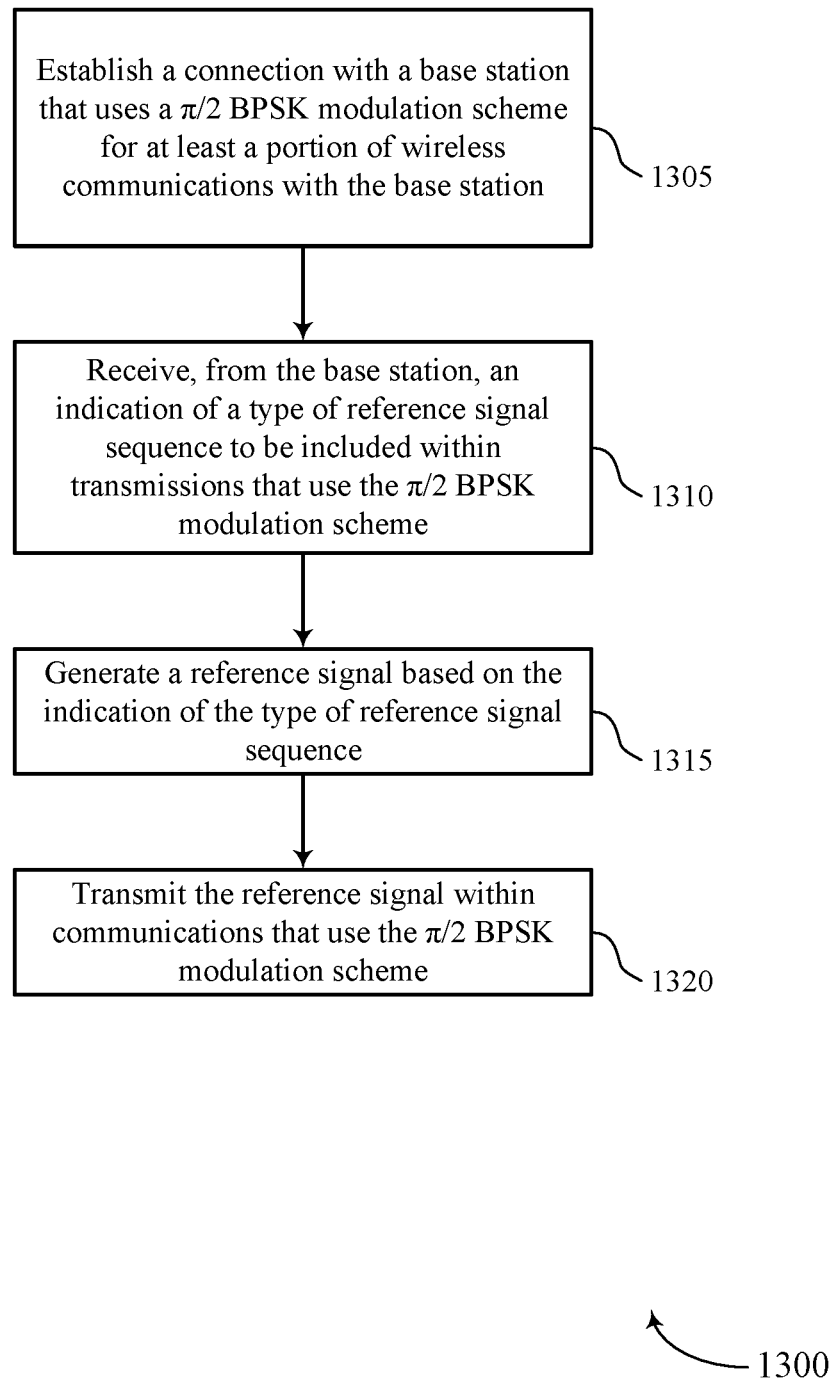
FIGS. 13 through 17 show flowcharts illustrating methods that support reference signal sequence identification in wireless communications in accordance with aspects of the present disclosure.

FIG. 13 shows a flowchart illustrating a method 1300 that supports reference signal sequence identification in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may establish a connection with a base station that uses a π/2 BPSK modulation scheme for at least a portion of wireless communications with the base station. The operations of 1305 may be performed according to the methods described herein. In some examples, aspects of the operations of 1305 may be performed by a connection establishment component as described with reference to FIGS. 5 through 8.

At 1310, the UE may receive, from the base station, an indication of a type of reference signal sequence to be included within transmissions that use the π/2 BPSK modulation scheme. The operations of 1310 may be performed according to the methods described herein. In some examples, aspects of the operations of 1310 may be performed by a reference signal component as described with reference to FIGS. 5 through 8.

At 1315, the UE may generate a reference signal based on the indication of the type of reference signal sequence. The operations of 1315 may be performed according to the methods described herein. In some examples, aspects of the operations of 1315 may be performed by a reference signal component as described with reference to FIGS. 5 through 8.

At 1320, the UE may transmit the reference signal within communications that use the π/2 BPSK modulation scheme. The operations of 1320 may be performed according to the methods described herein. In some examples, aspects of the operations of 1320 may be performed by a π/2 BPSK modulation component as described with reference to FIGS. 5 through 8.

Figure 14:
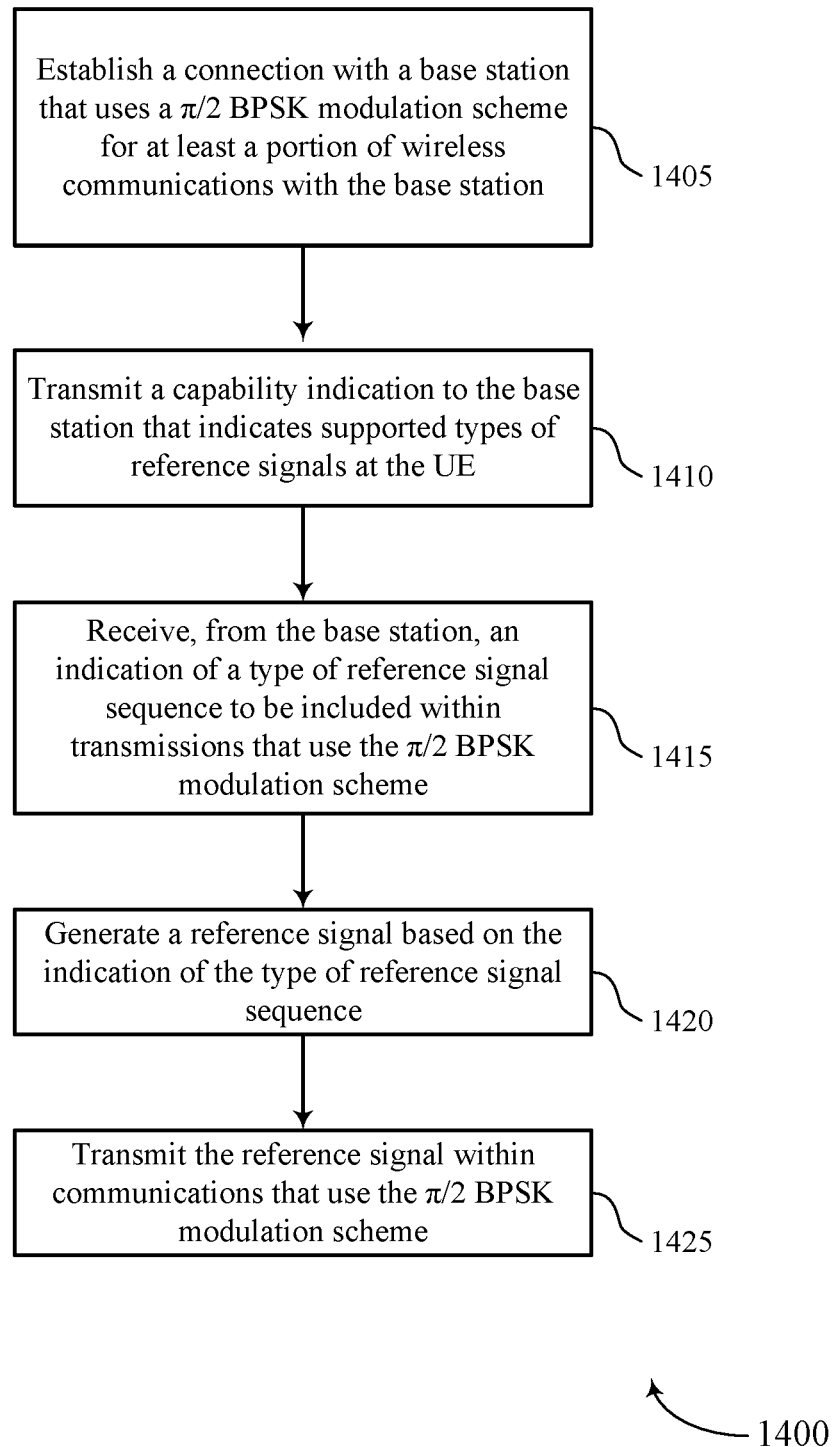

FIG. 14 shows a flowchart illustrating a method 1400 that supports reference signal sequence identification in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may establish a connection with a base station that uses a π/2 BPSK modulation scheme for at least a portion of wireless communications with the base station. The operations of 1405 may be performed according to the methods described herein. In some examples, aspects of the operations of 1405 may be performed by a connection establishment component as described with reference to FIGS. 5 through 8.

At 1410, the UE may transmit a capability indication to the base station that indicates supported types of reference signals at the UE. The operations of 1410 may be performed according to the methods described herein. In some examples, aspects of the operations of 1410 may be performed by a capability indication component as described with reference to FIGS. 5 through 8.

At 1415, the UE may receive, from the base station, an indication of a type of reference signal sequence to be included within transmissions that use the π/2 BPSK modulation scheme. The operations of 1415 may be performed according to the methods described herein. In some examples, aspects of the operations of 1415 may be performed by a reference signal component as described with reference to FIGS. 5 through 8. In some cases, the indication of the type of reference signal is responsive to the capability indication transmitted by the UE.

At 1420, the UE may generate a reference signal based on the indication of the type of reference signal sequence. The operations of 1420 may be performed according to the methods described herein. In some examples, aspects of the operations of 1420 may be performed by a reference signal component as described with reference to FIGS. 5 through 8.

At 1425, the UE may transmit the reference signal within communications that use the π/2 BPSK modulation scheme. The operations of 1425 may be performed according to the methods described herein. In some examples, aspects of the operations of 1425 may be performed by a π/2 BPSK modulation component as described with reference to FIGS. 5 through 8.

Figure 15:
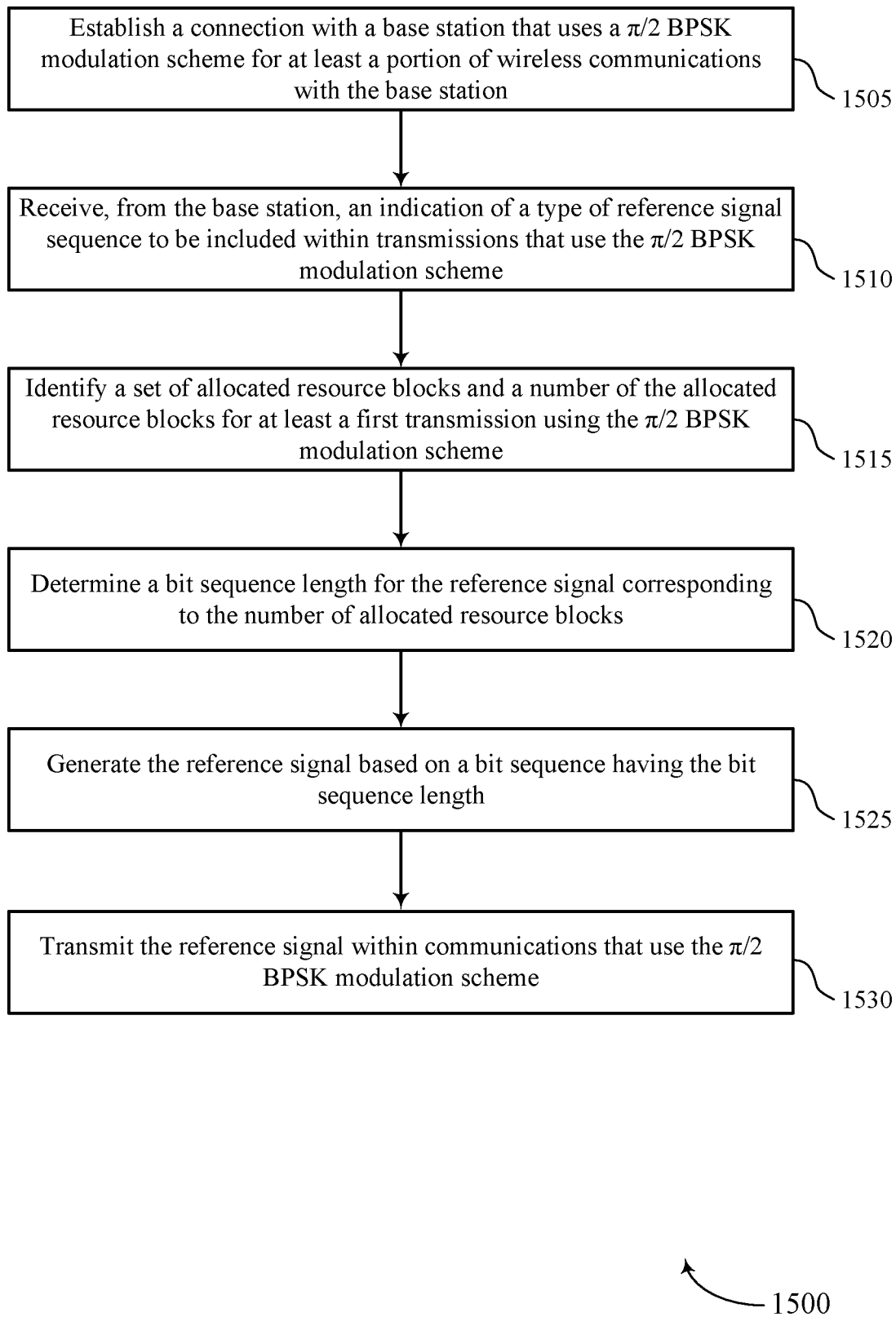

FIG. 15 shows a flowchart illustrating a method 1500 that supports reference signal sequence identification in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may establish a connection with a base station that uses a π/2 BPSK modulation scheme for at least a portion of wireless communications with the base station. The operations of 1505 may be performed according to the methods described herein. In some examples, aspects of the operations of 1505 may be performed by a connection establishment component as described with reference to FIGS. 5 through 8.

At 1510, the UE may receive, from the base station, an indication of a type of reference signal sequence to be included within transmissions that use the π/2 BPSK modulation scheme. The operations of 1510 may be performed according to the methods described herein. In some examples, aspects of the operations of 1510 may be performed by a reference signal component as described with reference to FIGS. 5 through 8.

At 1515, the UE may identify a set of allocated resource blocks and a number of the allocated resource blocks for at least a first transmission using the π/2 BPSK modulation scheme. The operations of 1515 may be performed according to the methods described herein. In some examples, aspects of the operations of 1515 may be performed by a resource allocation component as described with reference to FIGS. 5 through 8.

At 1520, the UE may determine a bit sequence length for the reference signal corresponding to the number of allocated resource blocks. The operations of 1520 may be performed according to the methods described herein. In some examples, aspects of the operations of 1520 may be performed by a reference signal component as described with reference to FIGS. 5 through 8.

At 1525, the UE may generate the reference signal based on a bit sequence having the bit sequence length. The operations of 1525 may be performed according to the methods described herein. In some examples, aspects of the operations of 1525 may be performed by a reference signal component as described with reference to FIGS. 5 through 8.

At 1530, the UE may transmit the reference signal within communications that use the π/2 BPSK modulation scheme. The operations of 1530 may be performed according to the methods described herein. In some examples, aspects of the operations of 1530 may be performed by a π/2 BPSK modulation component as described with reference to FIGS. 5 through 8.

Figure 16:
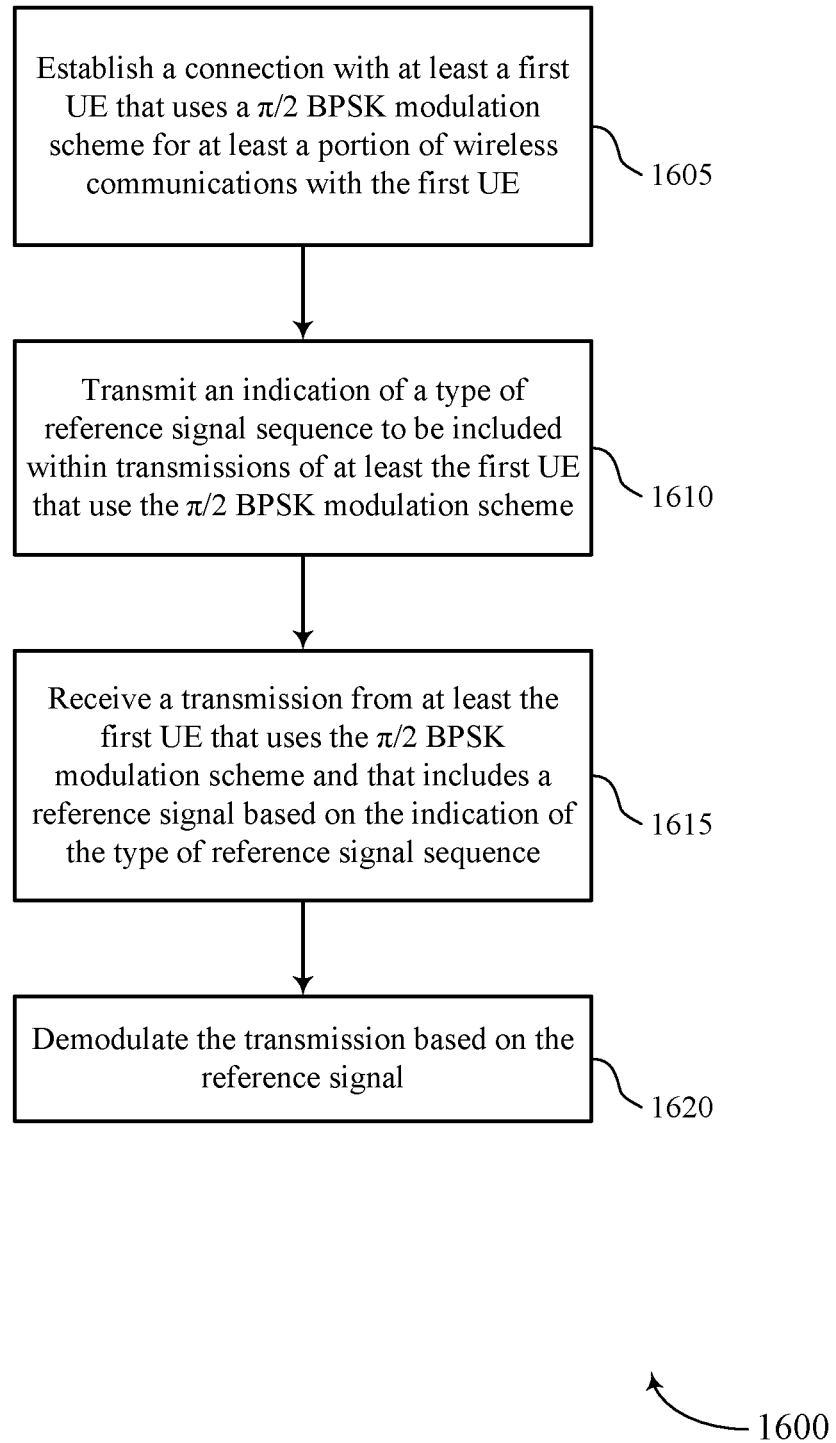

FIG. 16 shows a flowchart illustrating a method 1600 that supports reference signal sequence identification in wireless communications in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may establish a connection with at least a first UE that uses a π/2 BPSK modulation scheme for at least a portion of wireless communications with the first UE. The operations of 1605 may be performed according to the methods described herein. In some examples, aspects of the operations of 1605 may be performed by a connection establishment component as described with reference to FIGS. 9 through 12.

At 1610, the base station may transmit an indication of a type of reference signal sequence to be included within transmissions of at least the first UE that use the π/2 BPSK modulation scheme. The operations of 1610 may be performed according to the methods described herein. In some examples, aspects of the operations of 1610 may be performed by a reference signal component as described with reference to FIGS. 9 through 12.

At 1615, the base station may receive a transmission from at least the first UE that uses the π/2 BPSK modulation scheme and that includes a reference signal based on the indication of the type of reference signal sequence. The operations of 1615 may be performed according to the methods described herein. In some examples, aspects of the operations of 1615 may be performed by a reference signal component as described with reference to FIGS. 9 through 12.

At 1620, the base station may demodulate the transmission based on the reference signal. The operations of 1620 may be performed according to the methods described herein. In some examples, aspects of the operations of 1620 may be performed by a π/2 BPSK modulation component as described with reference to FIGS. 9 through 12.

Figure 17:
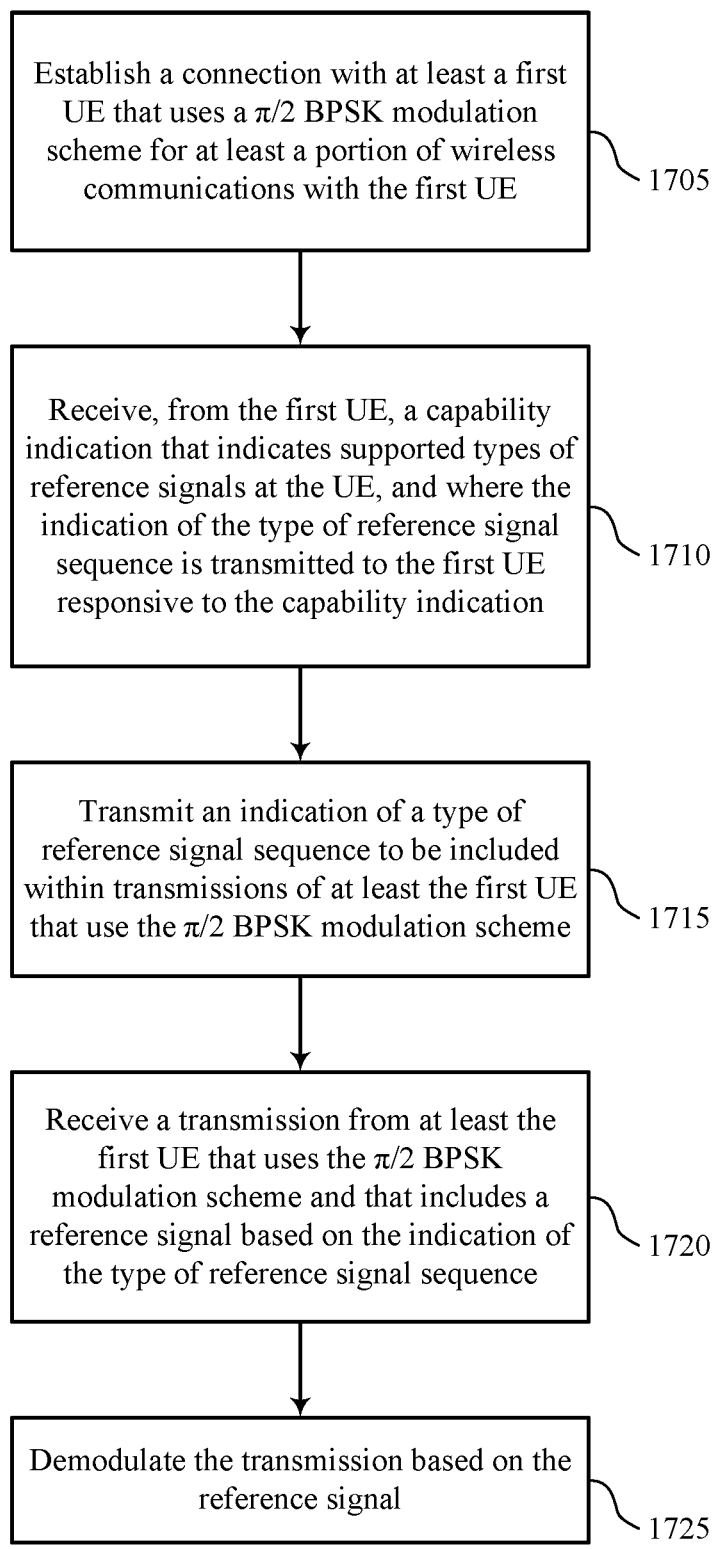

FIG. 17 shows a flowchart illustrating a method 1700 that supports reference signal sequence identification in wireless communications in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may establish a connection with at least a first UE that uses a π/2 BPSK modulation scheme for at least a portion of wireless communications with the first UE. The operations of 1705 may be performed according to the methods described herein. In some examples, aspects of the operations of 1705 may be performed by a connection establishment component as described with reference to FIGS. 9 through 12.

At 1710, the base station may receive, from the first UE, a capability indication that indicates supported types of reference signals at the UE, where an indication of the type of reference signal sequence is transmitted to the first UE responsive to the capability indication. The operations of 1710 may be performed according to the methods described herein. In some examples, aspects of the operations of 1710 may be performed by a capability indication component as described with reference to FIGS. 9 through 12.

At 1715, the base station may transmit an indication of a type of reference signal sequence to be included within transmissions of at least the first UE that use the π/2 BPSK modulation scheme. The operations of 1715 may be performed according to the methods described herein. In some examples, aspects of the operations of 1715 may be performed by a reference signal component as described with reference to FIGS. 9 through 12.

At 1720, the base station may receive a transmission from at least the first UE that uses the π/2 BPSK modulation scheme and that includes a reference signal based on the indication of the type of reference signal sequence. The operations of 1720 may be performed according to the methods described herein. In some examples, aspects of the operations of 1720 may be performed by a reference signal component as described with reference to FIGS. 9 through 12.

At 1725, the base station may demodulate the transmission based on the reference signal. The operations of 1725 may be performed according to the methods described herein. In some examples, aspects of the operations of 1725 may be performed by a π/2 BPSK modulation component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   establishing a connection with a base station that uses a π/2 binary phase shift keying (BPSK) modulation scheme for at least a portion of wireless communications with the base station;
   receiving, from the base station, an indication of a type of reference signal sequence to be included within transmissions that use the π/2 BPSK modulation scheme;
   generating a reference signal based at least in part on the indication of the type of reference signal sequence; and
   transmitting the reference signal within communications that use the π/2 BPSK modulation scheme.

2. The method of claim 1, wherein the indication of the type of reference signal sequence indicates a first type of reference signal sequence or a second type of reference signal sequence.

3. The method of claim 2, wherein the second type of reference signal sequence has a lower peak to average power ratio (PAPR) than the first type of reference signal sequence.

4. The method of claim 2, wherein the second type of reference signal sequence is a power deboosted version of the first type of reference signal sequence.

5. The method of claim 2, wherein:
   the first type of reference signal sequence is a Zadoff-Chu (ZC) sequence; and
   the second type of reference signal sequence is a power deboosted ZC sequence or a π/2 BPSK demodulation reference signal (DMRS) sequence.

6. The method of claim 5, wherein the indication of the type of reference signal sequence indicates the power deboosted ZC sequence and an amount of power deboosting to apply relative to data transmissions that use the π/2 BPSK modulation scheme.

7. The method of claim 1, wherein the indication from the base station is received via radio resource control (RRC) signaling.

8. The method of claim 7, wherein the RRC signaling is a cell-specific RRC transmission that indicates the type of reference signal sequence to be used by each UE in a cell served by the base station.

9. The method of claim 1, further comprising:
   transmitting a capability indication to the base station that indicates supported types of reference signals at the UE, and wherein the indication of the type of reference signal sequence is received responsive to the capability indication.

10. The method of claim 1, wherein the indication of the type of reference signal sequence provides an initial type of reference signal sequence, and wherein the method further comprises:
    transmitting a capability indication to the base station that indicates supported types of reference signals at the UE;
    receiving, responsive to the capability indication, a second indication of a type of reference signal sequence to be included within transmissions that use the π/2 BPSK modulation scheme; and
    generating a reference signal based at least in part on the second indication of the type of reference signal sequence.

11. The method of claim 1, wherein the generating the reference signal comprises:
    identifying a plurality of allocated resource blocks and a number of the allocated resource blocks for at least a first transmission using the π/2 BPSK modulation scheme;
    determining a bit sequence length for the reference signal corresponding to the number of allocated resource blocks; and
    generating the reference signal based at least in part on a bit sequence having the bit sequence length.

12. A method for wireless communication at a base station, comprising:
    establishing a connection with at least a first user equipment (UE) that uses a π/2 binary phase shift keying (BPSK) modulation scheme for at least a portion of wireless communications with the first UE;

transmitting an indication of a type of reference signal sequence to be included within transmissions of at least the first UE that use the π/2 BPSK modulation scheme;
receiving a transmission from at least the first UE that uses the π/2 BPSK modulation scheme and that includes a reference signal based at least in part on the indication of the type of reference signal sequence; and
demodulating the transmission based at least in part on the reference signal.

13. The method of claim 12, wherein the indication of the type of reference signal sequence indicates a first type of reference signal sequence or a second type of reference signal sequence.

14. The method of claim 13, wherein the second type of reference signal sequence has a lower peak to average power ratio (PAPR) than the first type of reference signal sequence.

15. The method of claim 13, wherein the second type of reference signal sequence is a power deboosted version of the first type of reference signal sequence.

16. The method of claim 13, wherein:
the first type of reference signal sequence is a Zadoff-Chu (ZC) sequence; and
the second type of reference signal sequence is a power deboosted ZC sequence or a π/2 BPSK demodulation reference signal (DMRS) sequence.

17. The method of claim 16, wherein the indication of the type of reference signal sequence indicates the power deboosted ZC sequence and an amount of power deboosting to apply relative to data transmissions that use the π/2 BPSK modulation scheme.

18. The method of claim 12, wherein the indication of the type of reference signal sequence is transmitted via radio resource control (RRC) signaling.

19. The method of claim 18, wherein the RRC signaling is a UE-specific RRC transmission that indicates the type of reference signal sequence to be used by the first UE, and wherein one or more other UEs are indicated to use a different type of reference signal sequence for transmissions that use the π/2 BPSK modulation scheme.

20. The method of claim 12, further comprising:
receiving, from the first UE, a capability indication that indicates supported types of reference signals at the first UE, and wherein the indication of the type of reference signal sequence is transmitted to the first UE responsive to the capability indication.

21. The method of claim 12, wherein the indication of the type of reference signal sequence provides an initial type of reference signal sequence, and wherein the method further comprises:
receiving, from the first UE, a capability indication that indicates supported types of reference signals at the first UE;
selecting, responsive to the capability indication, the type of reference signal sequence to be included within transmissions that use the π/2 BPSK modulation scheme; and
transmitting a second indication to the first UE of a type of reference signal sequence to be included within transmissions of at least the first UE that use the π/2 BPSK modulation scheme, wherein one or more subsequent communications with the first UE are based at least in part on the second indication.

22. An apparatus for wireless communication at a user equipment (UE), comprising:
a processor,
memory coupled to the processor; and
instructions stored in the memory and executable by the processor to cause the apparatus to:
establish a connection with a base station that uses a π/2 binary phase shift keying (BPSK) modulation scheme for at least a portion of wireless communications with the base station;
receive, from the base station, an indication of a type of reference signal sequence to be included within transmissions that use the π/2 BPSK modulation scheme;
generate a reference signal based at least in part on the indication of the type of reference signal sequence; and
transmit the reference signal within communications that use the π/2 BPSK modulation scheme.

23. The apparatus of claim 22, wherein the instructions are executable by the processor to cause the apparatus to receive the indication from the base station via a UE-specific radio resource control (RRC) transmission that indicates the type of reference signal sequence to be used by the UE.

24. The apparatus of claim 22, wherein the instructions are further executable by the processor to cause the apparatus to:
transmit a capability indication to the base station that indicates supported types of reference signals at the UE, and wherein the indication of the type of reference signal sequence is received responsive to the capability indication.

25. An apparatus for wireless communication at a base station, comprising:
a processor,
memory coupled to the processor; and
instructions stored in the memory and executable by the processor to cause the apparatus to:
establish a connection with at least a first user equipment (UE) that uses a π/2 binary phase shift keying (BPSK) modulation scheme for at least a portion of wireless communications with the first UE;
transmit an indication of a type of reference signal sequence to be included within transmissions of at least the first UE that use the π/2 BPSK modulation scheme;
receive a transmission from at least the first UE that uses the π/2 BPSK modulation scheme and that includes a reference signal based at least in part on the indication of the type of reference signal sequence; and
demodulate the transmission based at least in part on the reference signal.

26. The apparatus of claim 25, wherein the instructions are executable by the processor to cause the apparatus to:
transmit the indication of the type of reference signal sequence via radio resource control (RRC) signaling comprising a UE-specific RRC transmission that indicates the type of reference signal sequence to be used by the first UE; and
indicate that one or more other UEs are to use a different type of reference signal sequence for transmissions that use the π/2 BPSK modulation scheme.

27. The method of claim 1, wherein establishing the connection with the base station comprises:
receiving an indication from the base station to transmit uplink data to the base station using the π/2 BPSK modulation scheme.

28. The method of claim 12, wherein establishing the connection with at least the first UE comprises:

transmitting an indication to the first UE to transmit uplink data to the base station using the π/2 BPSK modulation scheme.

29. The apparatus of claim 22, wherein the instructions executable by the processor to cause the apparatus to establish the connection with the base station comprise instructions executable by the processor to cause the apparatus to:
receive an indication from the base station to transmit uplink data to the base station using the π/2 BPSK modulation scheme.

30. The apparatus of claim 25, wherein the instructions executable by the processor to cause the apparatus to establish the connection with at least the first UE comprise instructions executable by the processor to cause the apparatus to:
transmit an indication to the first UE to transmit uplink data to the base station using the π/2 BPSK modulation scheme.

* * * * *